United States Patent
Kurosawa

(10) Patent No.: US 11,539,180 B2
(45) Date of Patent: Dec. 27, 2022

(54) LASER APPARATUS AND EXTREME ULTRAVIOLET LIGHT GENERATION SYSTEM

(71) Applicant: Gigaphoton Inc., Tochigi (JP)

(72) Inventor: Yoshiaki Kurosawa, Oyama (JP)

(73) Assignee: Gigaphoton Inc., Tochigi (JP)

( * ) Notice: Subject to any disclaimer, the term of this patent is extended or adjusted under 35 U.S.C. 154(b) by 877 days.

(21) Appl. No.: 16/429,090

(22) Filed: Jun. 3, 2019

(65) Prior Publication Data

US 2019/0288478 A1 Sep. 19, 2019

Related U.S. Application Data

(63) Continuation of application No. PCT/JP2017/001947, filed on Jan. 20, 2017.

(51) Int. Cl.
*H01S 3/13* (2006.01)
*H01S 3/102* (2006.01)
(Continued)

(52) U.S. Cl.
CPC .......... *H01S 3/1024* (2013.01); *H01S 3/131* (2013.01); *H01S 3/134* (2013.01); *H01S 3/23* (2013.01); *H01S 3/2366* (2013.01)

(58) Field of Classification Search
CPC ........ H01S 3/1024; H01S 3/131; H01S 3/134; H01S 3/2366
See application file for complete search history.

(56) References Cited

U.S. PATENT DOCUMENTS

2013/0020499 A1* 1/2013 Kameda ............... H01S 3/0401
359/333
2013/0051412 A1* 2/2013 Miyao ................. H01S 3/10046
372/31
(Continued)

FOREIGN PATENT DOCUMENTS

JP 2008-042048 A 2/2008
JP 2012-069907 A 4/2012
(Continued)

OTHER PUBLICATIONS

An Office Action; "Notice of Reasons for Refusal", mailed by the Japanese Patent Office dated Jan. 19, 2021, which corresponds to Japanese Patent Application No. 2018-562827 and is related to U.S. Appl. No. 16/429,090; with English language translation.
(Continued)

*Primary Examiner* — Michael Carter
(74) *Attorney, Agent, or Firm* — Studebaker & Brackett PC

(57) ABSTRACT

A laser apparatus according to an aspect of the present disclosure includes: a master oscillator; at least one amplifier disposed on an optical path of a first pulse laser beam output from the master oscillator; a sensor disposed on an optical path of a second pulse laser beam output from the at least one amplifier; and a laser controller. The laser controller causes the laser apparatus to perform burst oscillation based on a burst signal from an external device, and performs processing of controlling a beam parameter based on a sensor output signal obtained from the sensor in a burst duration, and processing of detecting self-oscillation light from the amplifier based on a sensor output signal obtained from the sensor in a burst stop duration.

4 Claims, 27 Drawing Sheets

(51) Int. Cl.
*H01S 3/131* (2006.01)
*H01S 3/23* (2006.01)
*H01S 3/134* (2006.01)

(56) References Cited

U.S. PATENT DOCUMENTS

| | | | | |
|---|---|---|---|---|
| 2013/0208742 A1* | 8/2013 | Mizoguchi | ............ | H01S 3/0014 372/27 |
| 2014/0346375 A1* | 11/2014 | Nowak | ................ | H01S 3/0014 250/504 R |
| 2014/0348188 A1* | 11/2014 | Suganuma | ............ | H01S 3/2308 372/20 |
| 2016/0087389 A1* | 3/2016 | Niwano | ................ | H01S 3/1301 359/257 |
| 2017/0317464 A1 | 11/2017 | Kurosawa et al. | | |
| 2018/0019141 A1 | 1/2018 | Ohkubo et al. | | |

FOREIGN PATENT DOCUMENTS

| | | |
|---|---|---|
| JP | 2012-191171 A | 10/2012 |
| JP | 2013-201388 A | 10/2013 |
| JP | 2013-207298 A | 10/2013 |
| WO | 2012/026228 A1 | 3/2012 |
| WO | 2012/114172 A1 | 8/2012 |
| WO | 2013/144690 A1 | 10/2013 |
| WO | 2013/144695 A1 | 10/2013 |
| WO | 2015/012099 A1 | 1/2015 |
| WO | 2016/142995 A1 | 9/2016 |
| WO | 2016/147308 A1 | 9/2016 |

OTHER PUBLICATIONS

International Search Report issued in PCT/JP2017/001947; dated Mar. 28, 2017.
International Preliminary Report On Patentability and Written Opinion issued in PCT/JP2017/001947; dated Jul. 23, 2019.

* cited by examiner

LASER APPARATUS AND EXTREME ULTRAVIOLET LIGHT GENERATION SYSTEM

CROSS-REFERENCE TO RELATED APPLICATIONS

The present application is a continuation application of International Application No. PCT/JP2017/001947 filed on Jan. 20, 2017. The content of the application is incorporated herein by reference in its entirety.

BACKGROUND

1. Technical Field

The present disclosure relates to a laser apparatus and an extreme ultraviolet light generation system.

2. Related Art

Recently, miniaturization of a transfer pattern in optical lithography of a semiconductor process has been rapidly proceeding along with miniaturization of the semiconductor process. Minute fabrication at 20 nm or smaller will be requested in the next generation technology. To meet the request, it is desired to develop an exposure apparatus including an extreme ultraviolet light generation device configured to generate extreme ultraviolet (EUV) light at a wavelength of 13.5 nm in combination with reduced projection reflective optics.

Disclosed EUV light generation apparatuses include the three kinds of devices of a laser produced plasma (LPP) device that uses plasma generated by irradiating a target material with a laser beam, a discharge produced plasma (DPP) device that uses plasma generated by electrical discharge, and a synchrotron radiation (SR) device that uses synchrotron radiation light.

LIST OF DOCUMENTS

Patent Documents

Patent Document 1: Japanese Unexamined Patent Application Publication No. 2013-207298
Patent Document 2: Japanese Unexamined Patent Application Publication No. 2008-042048
Patent Document 3: Japanese Unexamined Patent Application Publication No. 2012-191171

SUMMARY

A laser apparatus according to an aspect of the present disclosure is a laser apparatus used together with an external device and including: a master oscillator configured to output a first pulse laser beam; at least one amplifier disposed on an optical path of the first pulse laser beam output from the master oscillator; a sensor disposed on an optical path of a second pulse laser beam output from the at least one amplifier; and a laser controller configured to control operation of the laser apparatus based on a burst signal sent out from the external device and a signal obtained from the sensor. The laser controller causes the laser apparatus to perform burst oscillation based on the burst signal, controls a beam parameter of at least one of the first pulse laser beam and the second pulse laser beam based on a signal obtained from the sensor in a burst duration in which the burst oscillation is performed, and detects self-oscillation light from the amplifier based on a signal obtained from the sensor in a burst stop duration in which the burst oscillation is stopped.

BRIEF DESCRIPTION OF THE DRAWINGS

Embodiments of the present disclosure will be described below as examples with reference to the accompanying drawings.

DESCRIPTION OF EMBODIMENTS

<Contents>
1. Overall description of extreme ultraviolet light generation system
    1.1 Configuration
    1.2 Operation
    1.3 Burst operation
2. Terms
3. Exemplary configuration of laser apparatus
    3.1 Configuration
    3.2 Operation
    3.3 Burst control
4. Problem
5. First Embodiment
    5.1 Configuration
    5.2 Operation
    5.3 Effects
6. Use example of beam profiler
    6.1 Configuration
    6.2 Operation
    6.3 Laser control process
        6.3.1 Optical axis control process
        6.3.2 Self-oscillation monitoring process
    6.4 Relation between burst command and beam detection
    6.5 Effects
7. Second Embodiment
    7.1 Configuration
    7.2 Operation
    7.3 Laser control process
        7.3.1 Energy control process
        7.3.2 Self-oscillation monitoring process
    7.4 Effects
8. Modification 1
9. Modification 2
10. Amplifier excitation intensity control scheme
    10.1 PWM scheme
    10.2 Potential control scheme
    10.3 Combination of PWM scheme and potential control scheme Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

Figure 1:
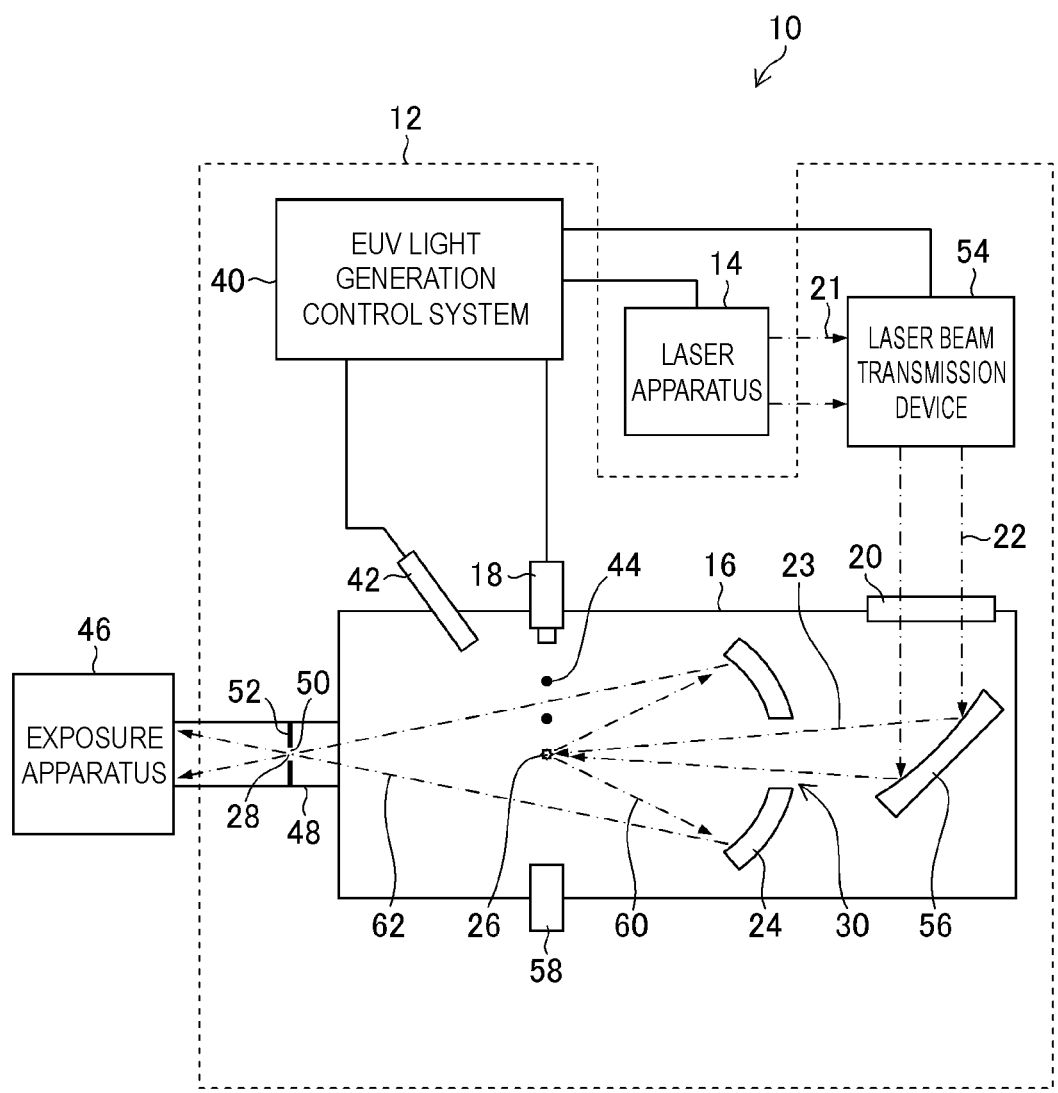
FIG. 1 is a diagram schematically illustrating the configuration of an exemplary LPP EUV light generation system.

1. Overall Description of Extreme Ultraviolet Light Generation System 1.1 Configuration FIG. 1 schematically illustrates the configuration of an exemplary LPP EUV light generation system 10. An EUV light generation apparatus 12 is used together with at least one laser apparatus 14 in some cases. In the present application, a system including the EUV light generation apparatus 12 and the laser apparatus 14 is referred to as the EUV light generation system 10. As illustrated in FIG. 1 and described below in detail, the EUV light generation apparatus 12 includes a chamber 16 and a target supply unit 18.

The chamber 16 is a sealable container. The target supply unit 18 supplies a target substance into the chamber 16, and is, for example, attached to penetrate through a wall of the chamber 16. The target substance may be made of tin, terbium, gadolinium, lithium, xenon, or a combination of any two or more of these materials, but is not limited thereto.

The wall of the chamber 16 is provided with at least one through-hole. The through-hole is blocked by a window 20 through which a pulse laser beam 22 output from the laser apparatus 14 transmits. For example, an EUV light condensation mirror 24 having a spheroidal reflection surface is disposed inside the chamber 16. The EUV light condensation mirror 24 has a first focal point and a second focal point. For example, a multi-layer reflective film obtained by alternately stacking molybdenum and silicon is formed on the surface of the EUV light condensation mirror 24. For example, the EUV light condensation mirror 24 is disposed so that the first focal point is positioned in a plasma generation region 26 and the second focal point is positioned at an intermediate focusing point (IF) 28. The EUV light condensation mirror 24 is provided with a through-hole 30 at a central part thereof through which a pulse laser beam 23 passes.

The EUV light generation apparatus 12 includes an EUV light generation control system 40 and a target sensor 42 and the like. The target sensor 42 detects any one or a plurality of the existence, locus, position, and speed of a target 44. The target sensor 42 may have an image capturing function.

The EUV light generation apparatus 12 includes a connection unit 48 through which the inside of the chamber 16 and the inside of an exposure apparatus 46 are communicated with each other. A wall 52 on which an aperture 50 is formed is provided inside the connection unit 48. The wall 52 is disposed so that the aperture 50 is positioned at the second focal point of the EUV light condensation mirror 24.

In addition, the EUV light generation apparatus 12 includes a laser beam transmission device 54, a laser beam condensation mirror 56, a target collection unit 58 for collecting the target 44, and the like. The laser beam transmission device 54 includes an optical element for defining the transmission state of a laser beam, and an actuator for adjusting the position, posture, and the like of the optical element. The target collection unit 58 is disposed on the extended line of a direction in which the target 44 output into the chamber 16 travels.

The laser apparatus 14 may be a master oscillator power amplifier (MOPA) system. The laser apparatus 14 may include a master oscillator (not illustrated), a light isolator (not illustrated), and a plurality of $CO_2$ laser amplifiers (not illustrated). The wavelength of a laser beam output from the master oscillator is, for example, 10.59 μm, and the repetition frequency of pulse oscillation is, for example, 100 kHz.

1.2 Operation

The following describes the operation of the exemplary LPP EUV light generation system 10 with reference to FIG. 1. The inside of the chamber 16 is held at a pressure lower than an atmospheric pressure, and is preferably vacuum. Alternatively, the inside of the chamber 16 may contain gas having a high transmissivity for EUV light.

A pulse laser beam 21 output from the laser apparatus 14 passes through the laser beam transmission device 54 and is incident in the chamber 16 through the window 20 as the pulse laser beam 22. The pulse laser beam 22 travels inside the chamber 16 along at least one laser beam path, and is reflected by the laser beam condensation mirror 56 and incident on the at least one target 44 as the pulse laser beam 23.

The target supply unit 18 outputs the target 44 formed of the target substance toward the plasma generation region 26 inside the chamber 16. The target supply unit 18 forms droplets by, for example, a continuous jet scheme. In the continuous jet scheme, a nozzle is vibrated to provide standing wave to flow of the target substance ejected in a jet form through a nozzle hole, thereby periodically separating the target substance. Each separated target substance may form into a droplet by forming a free interface due to the surface tension thereof.

The target 44 is irradiated with at least one pulse included in the pulse laser beam 23. Plasma is generated when the target 44 is irradiated with the pulse laser beam, and radiates radiation light 60. EUV light 62 included in the radiation light 60 is selectively reflected by the EUV light condensation mirror 24. The EUV light 62 reflected by the EUV light condensation mirror 24 is condensed at an intermediate focus point 28 and output to the exposure apparatus 46. The single target 44 may be irradiated with a plurality of pulses included in the pulse laser beam 23.

The EUV light generation control system 40 collectively controls the entire EUV light generation system 10. The EUV light generation control system 40 processes a result of detection by the target sensor 42. The EUV light generation control system 40 may control, based on the result of detection by the target sensor 42, for example, a timing at which the target 44 is output, a direction in which the target 44 is output, and the like. In addition, the EUV light generation control system 40 may control, for example, the oscillation timing of the laser apparatus 14, the traveling direction of the pulse laser beam 22, the condensation position of the pulse laser beam 23, and the like. These various kinds of control are merely exemplary, and may include other control as necessary.

In the present disclosure, the EUV light generation control system 40 and any other control device can be achieved by hardware and software combination of one or a plurality of computers. The software is synonymous with a computer program. The computers conceptually include a programmable controller.

Functions of a plurality of control devices can be achieved by a single control device. In the present disclosure, the EUV light generation control system 40 and the other control device may be connected with each other through a communication network a local area network or the Internet. In a distributed computing environment, a computer program unit may be stored in local and remote memory storage devices.

1.3 Burst Operation

The EUV light generation system 10 can output EUV light through a burst operation. The burst operation repeats, for a constant time, a burst duration in which EUV light is generated at a predetermined repetition frequency for a first predetermined duration, and a burst stop duration in which EUV light generation is stopped for a second predetermined duration. In the burst duration, pulse laser beam irradiation is performed at the predetermined repetition frequency, but in the burst stop duration, the pulse laser beam irradiation is stopped. Specifically, in the burst duration, the pulse laser beam 21 is output from the laser apparatus 14. In the burst stop duration, the outputting of the pulse laser beam 21 from the laser apparatus 14 is stopped. One burst duration is referred to as one burst in some cases.

A burst pattern in which the burst duration and the burst stop duration are repeated may be defined by data including any one or a plurality of EUV optical energy, the repetition frequency, and the number of pulses in the burst duration, the length of the burst stop duration, and the number of bursts. The burst pattern is instructed by the exposure apparatus 46.

Figure 2:
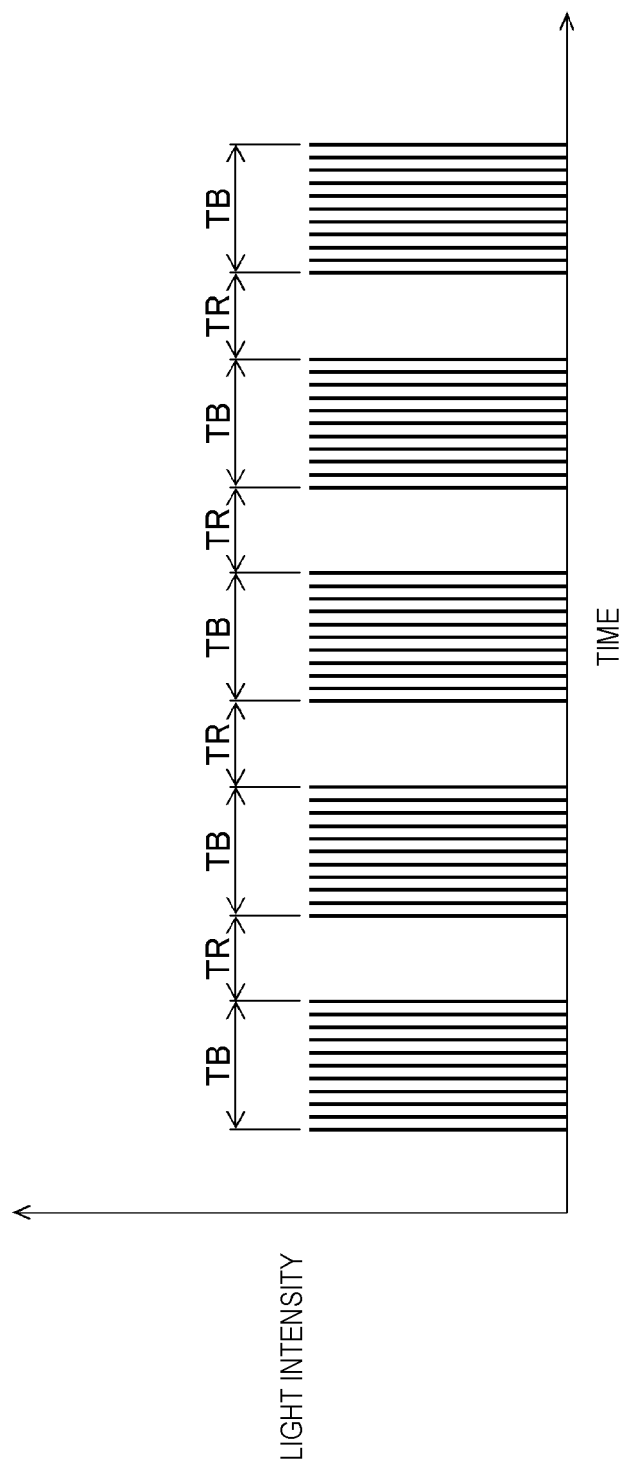
FIG. 2 is a diagram illustrating an operation state of the EUV light generation system.

FIG. 2 is a diagram illustrating the operation state of the EUV light generation system 10. The EUV light generation system 10 used together with the exposure apparatus 46 outputs pulses of EUV light at a predetermined repetition frequency (hereinafter referred to as pulse EUV light) to the exposure apparatus 46 when a wafer is exposed at the exposure apparatus 46. The duration in which the EUV light generation system 10 outputs the pulse EUV light to the exposure apparatus 46 is referred to as a burst duration TB (refer to FIG. 2).

The EUV light generation system 10 stops the pulse EUV light supply to the exposure apparatus 46 in a wafer movement time, a wafer replacement time, a mask replacement time, and the like at the exposure apparatus 46. The duration in which the EUV light generation system 10 stops the pulse EUV light supply to the exposure apparatus 46 is referred to as a burst stop duration TR.

In the EUV light generation system 10, as illustrated in FIG. 2, the laser apparatus 14 sometimes performs a burst operation of outputting a pulse laser beam at a predetermined repetition frequency as necessary to perform the burst operation of outputting the pulse EUV light as necessary. Pulse oscillation performed through a burst operation for a predetermined duration is referred to as burst oscillation.

2. Terms

"Pulse laser beam" may mean a laser beam containing a plurality of pulses.

"Laser beam" is not limited to a pulse laser beam, but may mean a general laser beam.

"Laser beam path" means the optical path of a laser beam. On the optical path of a laser beam, "upstream" refers to the generation source side of the laser beam, and "downstream" refers to the destination target side of the laser beam.

"$CO_2$" represents carbon dioxide.

"Predetermined repetition frequency" means a substantially predetermined repetition frequency, but does not necessarily need to be a constant repetition frequency.

"Target" is an object irradiated with a laser beam introduced into the chamber. When irradiated with the laser beam, the target generates plasma and radiates EUV light. The target is the plasma generation source.

"Droplet" is a form of the target supplied into the chamber. The droplet is synonymous with the target in the droplet form. The droplet may mean the target deformed into a substantially spherical shape due to the surface tension of the melted target substance.

"Plasma light" is radiation light radiated from the target as plasma. This radiation light includes EUV light.

"EUV light" stands for "extreme ultraviolet light".

3. Exemplary Configuration of Laser Apparatus 3.1 Configuration

Figure 3:
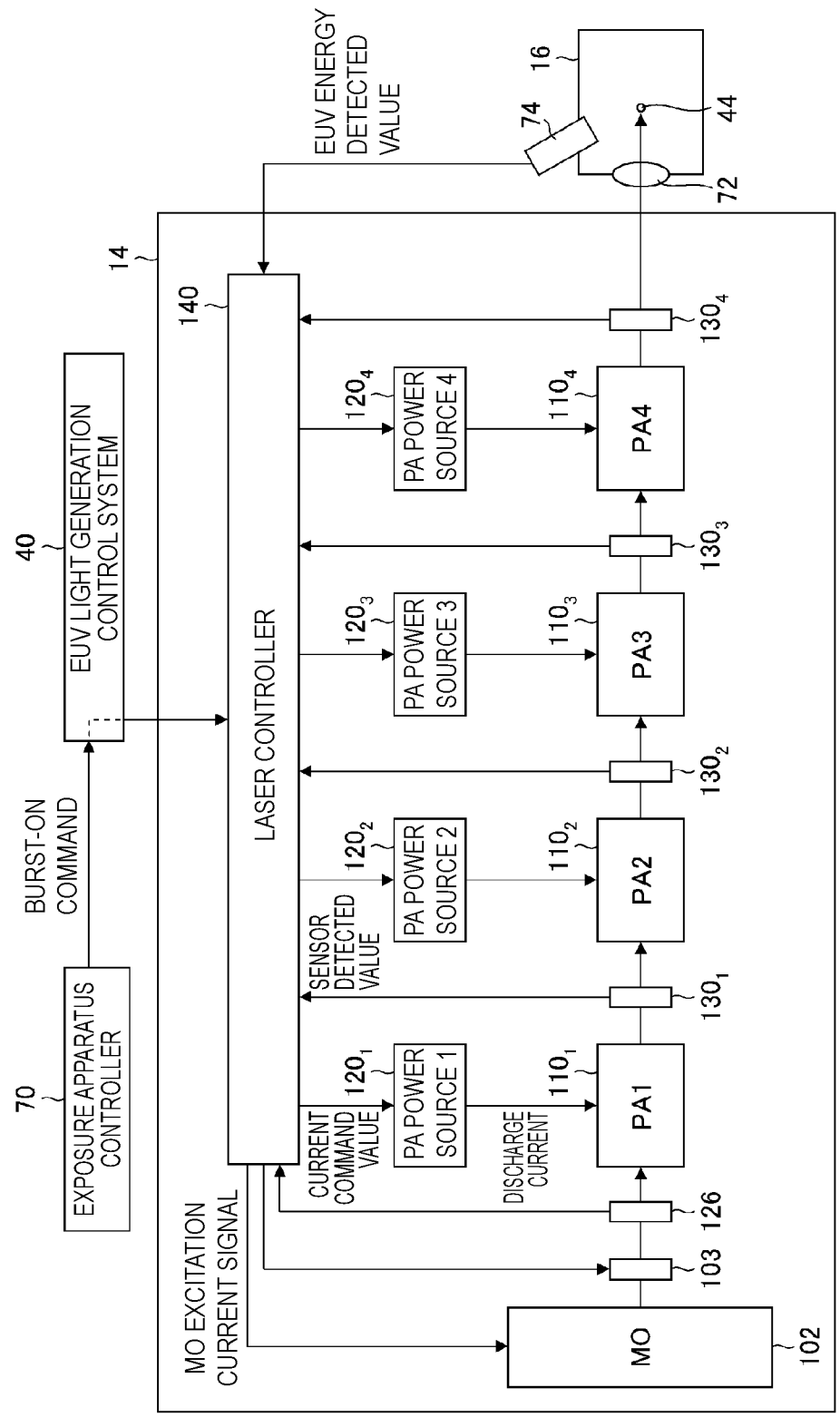
FIG. 3 is a diagram schematically illustrating an exemplary configuration of a laser apparatus used together with an EUV light generation apparatus.

FIG. 3 is a diagram schematically illustrating an exemplary configuration of the laser apparatus 14 used together with the EUV light generation apparatus. The laser apparatus 14 includes a master oscillator 102, an optical shutter 103, a plurality of amplifiers $110_1$ to $110_4$, a plurality of amplifier power sources $120_1$ to $120_4$, and a laser controller 140. The amplifiers $110_1$ to $110_4$ mean the "amplifiers $110_1$, $110_2$, $110_3$, and $110_4$". The amplifier power sources $120_1$ to $120_4$ mean the "amplifier power sources $120_1$, $120_2$, $120_3$, and $120_4$".

The master oscillator 102 and the amplifiers $110_1$ to $110_4$ are combined to achieve a master oscillator power amplifier (MOPA) system. The master oscillator 102 may be connected with a power source (not illustrated).

The master oscillator 102 can output, at a predetermined repetition frequency, a laser beam having a wavelength in the amplification region of a $CO_2$ laser amplifier. The wavelength of a pulse laser beam output from the master oscillator 102 is, for example, 10.59 micrometers [μm], and the predetermined repetition frequency is, for example, 100 kilohertz [kHz]. The master oscillator 102 may be a solid-state laser. Alternatively, the master oscillator 102 may be a semiconductor laser. In the present specification and the accompanying drawings, "MO" represents "master oscillator". The master oscillator 102 is connected with the laser controller 140.

The optical shutter 103 is disposed on the optical path of the pulse laser beam output from the master oscillator 102. The optical shutter 103 is connected with the laser controller 140.

The amplifiers $110_1$ to $110_4$ are disposed on the optical path of the pulse laser beam output from the master oscillator 102. Among the amplifiers $110_1$ to $110_4$ disposed on the optical path of the pulse laser beam, the first amplifier $110_1$ from the upstream side on the optical path in FIG. 3 is denoted by "PA1", the second amplifier $110_2$ is denoted by "PA2", the third amplifier $110_3$ is denoted by "PA3", and the fourth amplifier $110_4$ is denoted by "PA4". The upstream side on the optical path is a side closer to the master oscillator 102 on the optical path of the pulse laser beam. The pulse laser beam travels from the upstream side toward the downstream side on the optical path. In the present specification and the accompanying drawings, "PA" represents "amplifier".

Although FIG. 3 illustrates an exemplary laser apparatus 14 including the four amplifiers $110_1$ to $110_4$, the number of amplifiers included in an MOPA system is not limited to the present example. The laser apparatus 14 may include n amplifiers. The number n may be an integer equal to one or larger. In other words, the laser apparatus 14 includes at least one amplifier, and the amplifier is disposed on the optical path of the pulse laser beam output from the master oscillator 102.

The amplifiers $110_1$ to $110_4$ are each a $CO_2$ laser amplifier that uses $CO_2$ laser gas as a medium. The $CO_2$ laser amplifier amplifies a laser beam through discharging excitation of $CO_2$ laser gas. The $CO_2$ laser gas is an exemplary laser medium containing carbon dioxide.

The amplifiers $110_1$ to $110_4$ are connected with the corresponding amplifier power sources $120_1$ to $120_4$. In FIG. 3, the amplifier power source $120_1$ connected with the amplifier $110_1$ is written as "PA power source 1", the amplifier power source $120_2$ connected with the amplifier $110_2$ is written as "PA power source 2", the amplifier power source $120_3$ connected with the amplifier $110_3$ is written as "PA power source 3", and the amplifier power source $120_4$ connected with the amplifier $110_4$ is written as "PA power source 4". The amplifier power sources $120_1$ to $120_4$ are high-frequency (RF) power sources configured to supply electrical power necessary for discharging excitation to the amplifiers $110_1$ to $110_4$. The amplifier power sources $120_1$ to $120_4$ are connected with the laser controller 140. "RF" stands for radio frequency.

The laser apparatus 14 includes an MO sensor 126 and amplifier sensors $130_1$ to $130_4$. The MO sensor 126 is disposed on the laser beam path between the master oscillator 102 and the first amplifier $110_1$. The MO sensor 126 may be an energy sensor configured to detect the energy of the pulse laser beam output from the master oscillator 102.

The amplifier sensors $130_1$ to $130_4$ are each disposed on the emission side of the corresponding one of the amplifiers $110_1$ to $110_4$. The amplifier sensors $130_1$ to $130_4$ may be each an energy sensor configured to detect the energy of light output from the corresponding one of the amplifiers $110_1$ to $110_4$.

The MO sensor 126 and the amplifier sensors $130_1$ to $130_4$ are each connected with the laser controller 140. A sensor output signal from each of the MO sensor 126 and the amplifier sensors $130_1$ to $130_4$ is input to the laser controller 140.

The laser controller 140 is a control device configured to control the operation of the laser apparatus 14. The laser controller 140 is connected with the EUV light generation control system 40. The EUV light generation control system 40 is connected with an exposure apparatus controller 70. The exposure apparatus controller 70 is a control device configured to control the operation of the exposure apparatus 46. The exposure apparatus controller 70 may be included in the exposure apparatus 46 described with reference to FIG. 1.

An EUV optical sensor 74 is disposed in the chamber 16. The EUV optical sensor 74 may be an energy sensor configured to detect the energy of EUV light generated in the chamber 16. The EUV optical sensor 74 is connected with the laser controller 140. Although FIG. 3 illustrates one EUV optical sensor 74, a plurality of EUV optical sensors 74 may be disposed in the chamber 16.

The chamber 16 includes a laser beam condensation optical system 72. Although illustration of the laser beam condensation optical system 72 is simplified in FIG. 3, the laser beam condensation optical system 72 includes the laser beam condensation mirror 56 described with reference to FIG. 1.

3.2 Operation

The exposure apparatus controller 70 can transmit a burst-on command or a burst-off command to the EUV light generation control system 40 of the EUV light generation apparatus 12. Having received the burst-on command from the exposure apparatus controller 70, the laser apparatus 14 generates a pulse laser beam. The laser controller 140 controls the operation of the laser apparatus 14 in accordance with a command from the EUV light generation control system 40. The laser controller 140 can receive a burst allowing signal S1 and a burst inhibiting signal S2 from the exposure apparatus controller 70 through the EUV light generation control system 40.

The laser controller 140 causes the master oscillator 102 to perform laser oscillation at a predetermined repetition frequency. The laser controller 140 outputs an MO excitation current signal to the master oscillator 102. The laser controller 140 operates the optical shutter 103 to cause the laser apparatus 14 to perform the burst operation.

The laser controller 140 opens the optical shutter 103 in the burst duration TB, and closes the optical shutter 103 in the burst stop duration TR. An "opened" state of the optical shutter 103 means a state in which a pulse laser beam is transmitted through the optical shutter 103. A "closed" state of the optical shutter 103 means a state in which a pulse laser beam is not transmitted through the optical shutter 103.

At a predetermined time before start of the burst duration TB, the laser controller 140 operates the amplifier power sources $120_1$ to $120_4$ so that the amplifiers $110_1$ to $110_4$ have predetermined excitation intensities. This predetermined time is denoted by Ts (refer to FIG. 4).

The laser controller 140 receives, from the EUV light generation control system 40, a signal commanding a timing to start excitation of the amplifiers $110_1$ to $110_4$. The laser controller 140 outputs a current command value for excitation discharging to each of the amplifier power sources $120_1$ to $120_4$. The amplifier power sources $120_1$ to $120_4$ supply discharge current to the amplifiers $110_1$ to $110_4$ in accordance with the current command value from the laser controller 140.

The amplifier power sources $120_1$ to $120_4$ continue excitation of the amplifiers $110_1$ to $110_4$ in a burst-off duration.

The MO sensor 126 detects the energy of the pulse laser beam output from the master oscillator 102. Information of a sensor detected value output from the MO sensor 126 is input to the laser controller 140.

The amplifier sensor $130_1$ detects the energy of a pulse laser beam output from the amplifier $110_1$. The amplifier sensor $130_1$ transmits information of the detected value to the laser controller 140. Similarly, the amplifier sensors $130_2$, $130_3$, and $130_4$ detect the energies of pulse laser beams output from the amplifiers $110_2$, $110_3$, and $110_4$ and transmit information of the detected values to the laser controller 140.

A pulse laser beam output from the laser apparatus 14 is incident on the target 44 through the laser beam condensation optical system 72.

3.3 Burst Control

Figure 4:
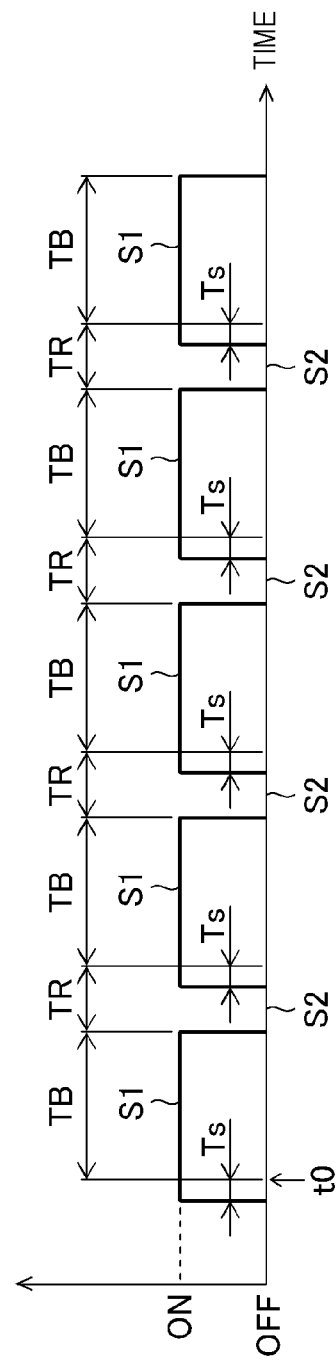
FIG. 4 is a timing chart illustrating an exemplary burst allowing signal and an exemplary burst inhibiting signal received from an exposure apparatus controller through an EUV light generation control system by a laser controller.

The following describes various signals and the waveform of a pulse laser beam at the laser apparatus 14 with reference to FIG. 4. FIG. 4 is a timing chart illustrating an exemplary burst allowing signal S1 and an exemplary burst inhibiting signal S2 received from the exposure apparatus controller 70 through the EUV light generation control system 40 by the laser controller 140.

Figure 5:
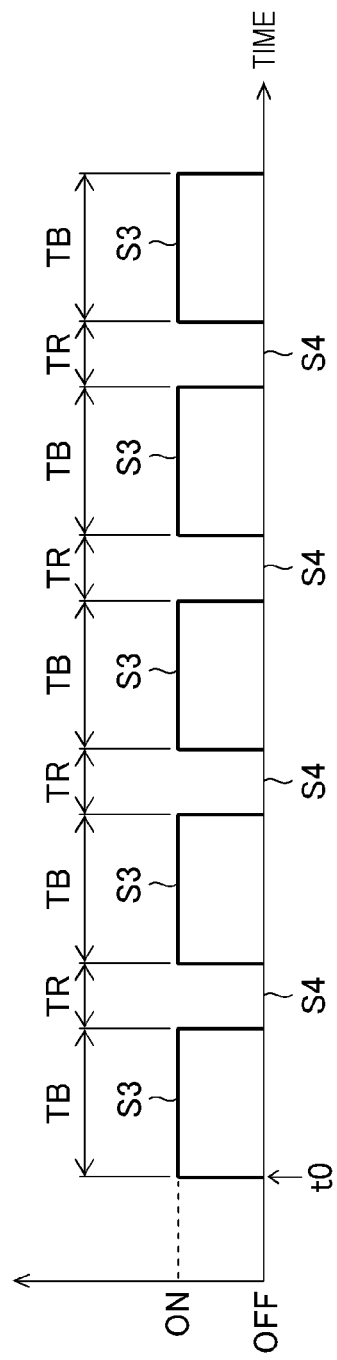
FIG. 5 is a timing chart illustrating exemplary burst-on and burst-off signals received from the EUV light generation control system by the laser controller.

FIG. 5 is a timing chart illustrating an exemplary burst-on signal S3 and an exemplary burst-off signal S4 received from the EUV light generation control system 40 by the laser controller 140. The burst allowing signal S1 is a signal with which the exposure apparatus controller 70 allows the laser apparatus 14 to perform burst outputting of pulse EUV light. The burst-on signal S3 is a signal with which the EUV light generation control system 40 commands the laser controller 140 of the laser apparatus 14 to perform burst outputting of a pulse laser beam. Thus, the burst duration TB is a duration in which the burst-on signal S3 is output from an EUV light generation control system 5. In the present description, the burst allowing signal S1 is a signal having a voltage level at "ON", and the burst inhibiting signal S2 is a signal having a voltage level at "OFF". Similarly, the burst-on signal S3 is a signal having a voltage level at "ON", and the burst-off signal S4 is a signal having a voltage level at "OFF". The voltage level corresponding to "OFF" may be zero.

The burst-on signal S3 is input to the laser controller 140 at a timing delayed from the rise timing of the burst allowing signal S1 by a predetermined time Ts. In FIGS. 4 and 5, time t0 indicates the timing at which the burst-on signal S3 is input to the laser controller 140.

The burst inhibiting signal S2 is a signal with which the exposure apparatus controller 70 allows the laser apparatus 14 to perform burst outputting of pulse EUV light. The burst-off signal S4 is a signal with which the EUV light generation control system 40 causes the laser controller 140 of the laser apparatus 14 to stop burst outputting of a pulse laser beam. Timings at which the burst inhibiting signal S2 and the burst-off signal S4 are input to the laser controller 140, in other words, the fall timings of the burst allowing signal S1 and the burst-on signal S3 may be simultaneous. Alternatively, the burst-off signal S4 may be input to the laser controller 140 at a timing delayed from the timing of the burst inhibiting signal S2 by the predetermined time Ts.

The burst-on signal S3 and the burst-off signal S4, which are transferred from the EUV light generation control system to the laser controller in response to the burst allowing signal S1 and the burst inhibiting signal S2 emitted from the exposure apparatus controller 70, correspond to exemplary "burst signals sent out from an external device". The burst-on signal S3 and the burst-off signal S4 may be sent out from the exposure apparatus controller 70.

Figure 6:
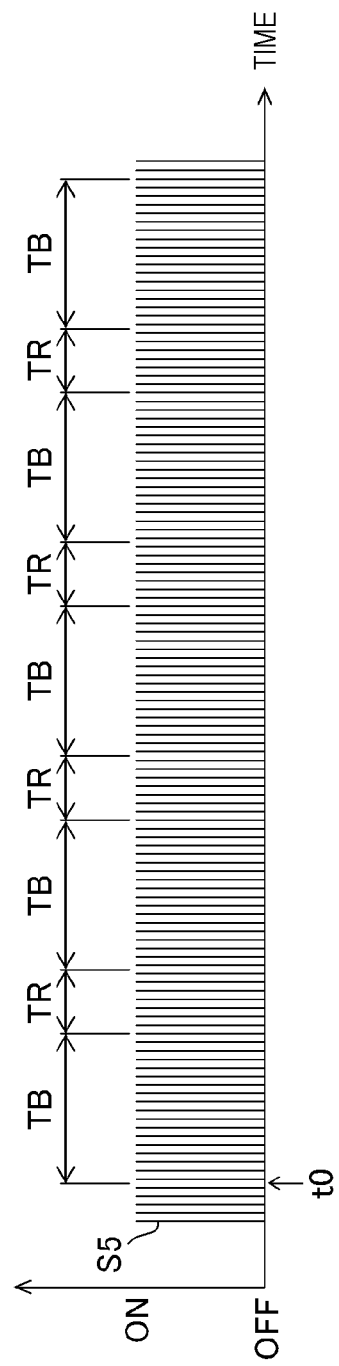
FIG. 6 is a timing chart illustrating an exemplary oscillation trigger input to a master oscillator from the laser controller.

FIG. 6 is a timing chart illustrating an exemplary oscillation trigger S5 received from the EUV light generation control system 5 and input to the master oscillator 102 by the laser controller 140. As illustrated in FIG. 6, the oscillation trigger S5 may be input to the master oscillator 102 at a predetermined repetition frequency at a timing at which system operation becomes ready after the laser apparatus 14 is activated. The timing at which system operation becomes ready means a timing at which the laser apparatus 14 becomes ready for laser oscillation. Alternatively, for example, the oscillation trigger S5 may be continuously input to the master oscillator 102 at the predetermined repetition frequency at a timing at which the burst allowing signal S1 is first received from the EUV light generation control system 5. Thus, in the burst stop duration TR, too, the oscillation trigger S5 may be input to the master oscillator 102 at the predetermined repetition frequency.

Figure 7:
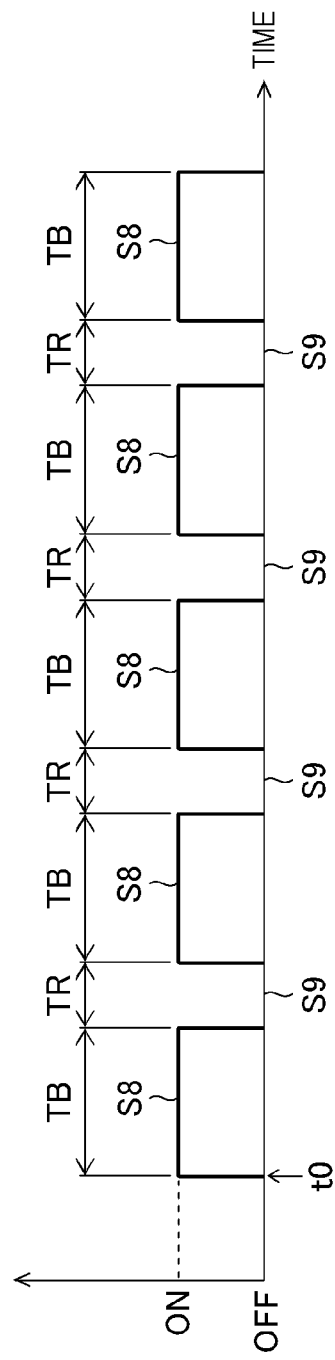
FIG. 7 is a timing chart illustrating exemplary open and close signals provided to an optical shutter by the laser controller.

FIG. 7 is a timing chart illustrating an exemplary open signal S8 and an exemplary close signal S9 provided to the optical shutter 103 by the laser controller 140.

Figure 8:
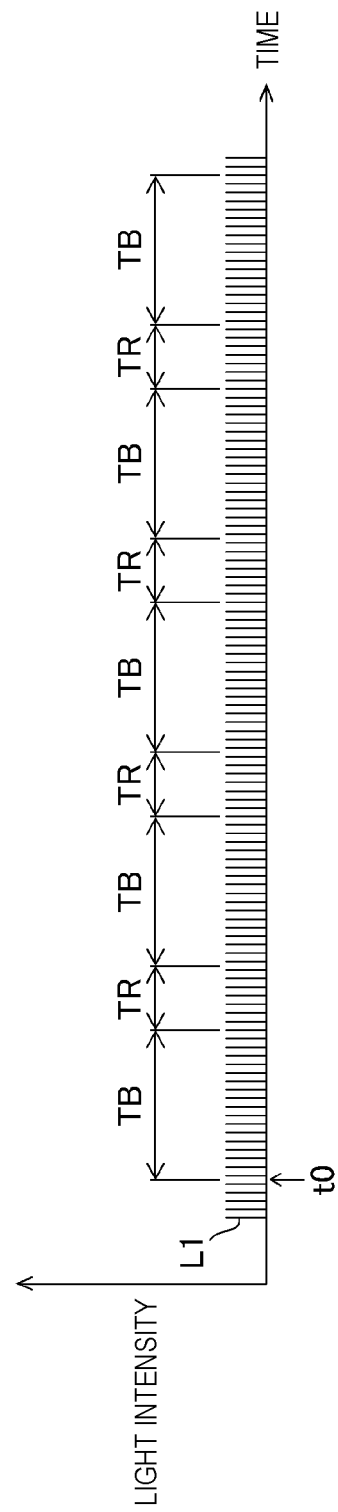
FIG. 8 is a timing chart illustrating an exemplary pulse laser beam output from the master oscillator.
Figure 9:
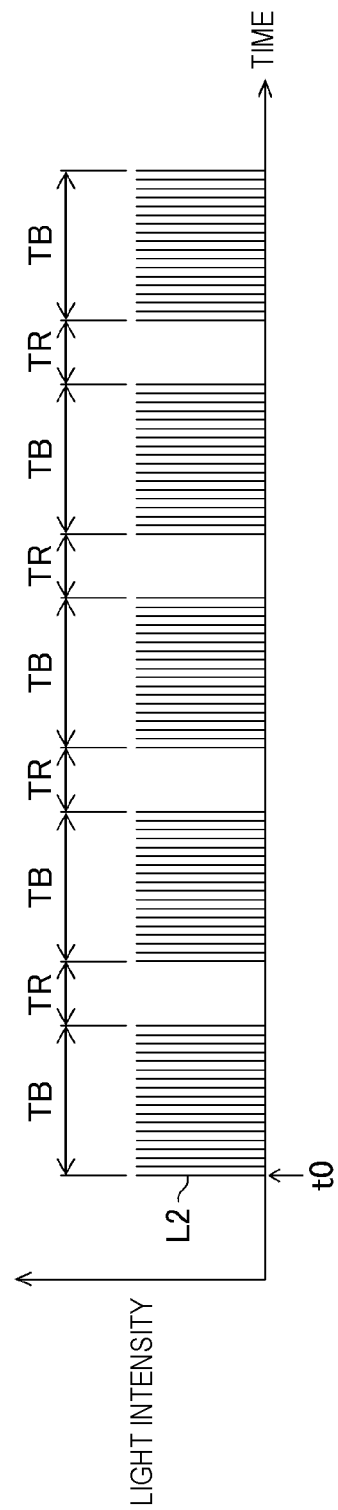
FIG. 9 is a timing chart illustrating an exemplary pulse laser beam output from an amplifier disposed downstream of the optical shutter.

FIG. 8 is a timing chart illustrating an exemplary pulse laser beam L1 output from the master oscillator 102. FIG. 9 is a timing chart illustrating a pulse laser beam L2 output from any one of the amplifiers $110_1$ to $110_4$ disposed downstream of the optical shutter 103, for example, from the last amplifier $110_4$.

As illustrated in FIG. 7, in a duration in which the burst-on signal S3 is input from the EUV light generation control system 5, in other words, in the burst duration TB, the laser controller 140 may input the open signal S8 for opening the optical shutter 103 to the optical shutter 103. In the other duration, in other words, the burst stop duration TR, the laser controller 140 inputs the close signal S9 for closing the optical shutter 103 to the optical shutter 103.

As illustrated in FIG. 8, the master oscillator 102 continuously outputs the pulse laser beam L1 at a predetermined repetition frequency in accordance with the oscillation trigger S5 illustrated in FIG. 6. Thus, in the burst stop duration TR, the outputting of the pulse laser beam L1 is cut off by the optical shutter 103. As a result, as illustrated in FIG. 9, the amplified pulse laser beam L2 is output from, for example, the last amplifier $110_4$ among the amplifiers $110_1$ to $110_4$ downstream of the optical shutter 103 only in the burst duration TB. The pulse laser beam L1 output from the master oscillator 102 is also called a seed beam in some cases. The pulse laser beam L1 corresponds to an exemplary "first pulse laser beam".

4. Problem

The laser apparatus 14 inputs the seed beam to the amplifiers $110_1$ to $110_4$ to amplify a laser beam. However, when no seed beam is input to the amplifiers $110_1$ to $110_4$, self-oscillation occurs at the amplifiers $110_1$ to $110_4$ in some cases. The excited state of each amplifier is maintained in the burst stop duration TR of the burst operation. When the excited state of the amplifier is maintained and a high-gain state is maintained, self-oscillation can occur at the amplifier while no seed beam is input to the amplifier, thereby generating self-oscillation light. The self-oscillation light generated at the amplifier travels also in the upstream direction (returning direction) of a laser beam path.

When returning in the upstream direction of the laser beam path, the self-oscillation light as an amplified beam generated through the self-oscillation can damage an optical element or the like in the laser apparatus 14. In addition, the energy of the amplifier is wasted through the self-oscillation, and thus necessary amplification cannot be obtained through the amplifier when the seed beam is input in the burst duration, and the pulse laser beam L2 cannot be stably output. With a conventional device configuration, it has been difficult to automatically detect generation of self-oscillation at the amplifier in the burst stop duration.

5. First Embodiment 5.1 Configuration

Figure 10:
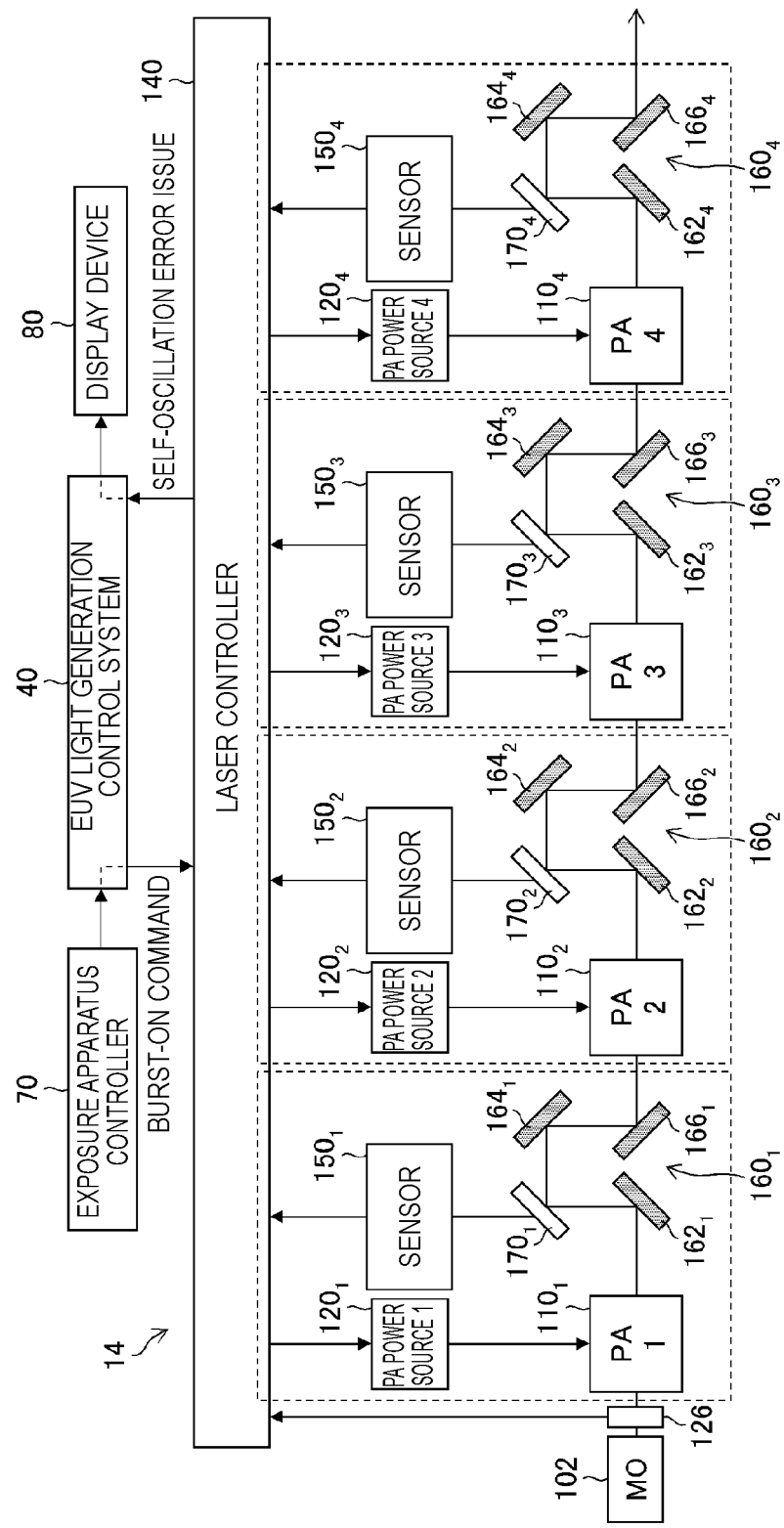
FIG. 10 is a block diagram exemplarily illustrating the configuration of the laser apparatus according to a first embodiment.

FIG. 10 is a block diagram exemplarily illustrating the configuration of the laser apparatus according to a first embodiment. As illustrated in FIG. 10, the laser apparatus 14 includes, on the laser beam path, sensors $150_1$ to $150_4$ configured to measure beam parameters of a laser beam. The sensors $150_1$ to $150_4$ mean the "sensors $150_1$, $150_2$, $150_3$, and $150_4$".

In FIG. 10, the sensors $150_1$ to $150_4$ are disposed on the laser beam path after the amplifiers $110_1$ to $110_4$, but the disposition of the sensors $150_1$ to $150_4$ is not limited to the example illustrated in FIG. 10. In a multi-stage amplifier system in which a plurality of amplifiers are sequentially arranged on the laser beam path, a sensor configured to measure a beam parameter is disposed after at least one amplifier. For example, the sensor $150_4$ may be disposed only after the last amplifier $110_4$. Detection sensitivity is highest after the last amplifier, and thus a sensor is preferably disposed at least after the last amplifier.

The sensors $150_1$ to $150_4$ are each, for example, a beam profiler. Beam parameters that can be measured by the beam profiler include a beam light amount, beam area, and a beam position. The beam area is the area of a beam section orthogonal to the optical axis of the laser beam path. The beam position is the central position of the beam section.

The laser apparatus 14 includes laser beam transmission optical systems $160_1$ to $160_4$ configured to guide laser beams to the sensors $150_1$ to $150_4$, respectively. The laser beam transmission optical system $160_1$ includes, for example, a first mirror $162_1$, a beam splitter $170_1$, a second mirror $164_1$, and a third mirror $166_1$.

Similarly, the laser beam transmission optical systems $160_2$, $160_3$, and $160_4$ include first mirrors $162_2$, $162_3$, and $162_4$, beam splitters $170_2$, $170_3$, and $170_4$, second mirrors $164_2$, $164_3$, and $164_4$, and third mirrors $166_2$, $166_3$, and $166_4$, respectively.

The EUV light generation apparatus 12 includes a display device 80. The display device 80 is connected with the EUV light generation control system 40. The display device 80 may be a display of a computer configured to function as the EUV light generation control system 40.

5.2 Operation

When a signal that commands "burst on" is output from the exposure apparatus controller 70, the laser apparatus 14 generates a pulse laser beam. A laser beam output from the amplifier $110_1$ in the burst duration is reflected by the first mirror $162_1$ and travels toward the beam splitter $170_1$. Part of the laser beam reflected by the first mirror $162_1$ transmits through the beam splitter $170_1$ and is incident on the sensor $150_1$. A laser beam reflected by the beam splitter $170_1$ is input to the next amplifier $110_2$ through the second mirror $164_1$ and the third mirror $166_1$.

Similarly, a laser beam output from the amplifier $110_2$ in the burst duration is reflected by the first mirror $162_2$ and travels toward the beam splitter $170_2$. Part of the laser beam reflected by the first mirror $162_2$ transmits through the beam splitter $170_2$ and is incident on the sensor $150_2$. A laser beam reflected by the beam splitter $170_2$ is input to the next amplifier $110_3$ through the second mirror $164_2$ and the third mirror $166_2$.

The laser beam transmission optical system $160_3$ and the sensor $150_3$ disposed after the amplifier $110_3$, and the laser beam transmission optical system $160_4$ and the sensor $150_4$ disposed after the amplifier $110_4$ operate in a similar manner.

A pulse laser beam output from the last amplifier $110_4$ is finally output as the pulse laser beam 21 from the laser apparatus 14 through the third mirror $166_4$ (refer to FIG. 1).

The laser controller 140 performs control of a laser beam, for example, feedback control of the optical axis of the laser beam path based on signals (sensor output signals) obtained from the sensors $150_1$ to $150_4$.

In the burst stop duration, the laser controller 140 monitors the sensor output signals from the sensors $150_1$ to $150_4$, determines beam existence, and determines that self-oscillation is occurring when the beam existence determination is positive. When the laser controller 140 determines that self-oscillation is occurring, the laser controller 140 issues self-oscillation error to the EUV light generation control system 40.

In addition, when the laser controller 140 determines that self-oscillation is occurring, the laser controller 140 performs control to reduce the discharging intensity of at least one of the amplifier power sources $120_1$ to $120_4$. Control to reduce excitation intensity includes control to stop excitation.

When the EUV light generation control system 40 receives the self-oscillation error from the laser controller 140, the EUV light generation control system 40 displays a warning on the display device 80.

5.3 Effects

According to the first embodiment, a sensor used for beam control is utilized for self-oscillation detection, optical axis control and self-oscillation monitoring are switched in response to a burst signal. According to the first embodiment, self-oscillation can be detected by using a sensor also used for the optical axis control, without using an additional special sensor for detecting self-oscillation. Accordingly, when self-oscillation occurs in the burst stop duration, the occurrence of self-oscillation can be automatically detected. In addition, according to the first embodiment, when self-oscillation is detected, excitation of at least one amplifier is stopped to prevent damage on an optical element or the like included in the laser apparatus 14.

6. Use Example of Beam Profiler

6.1 Configuration

Figure 11:
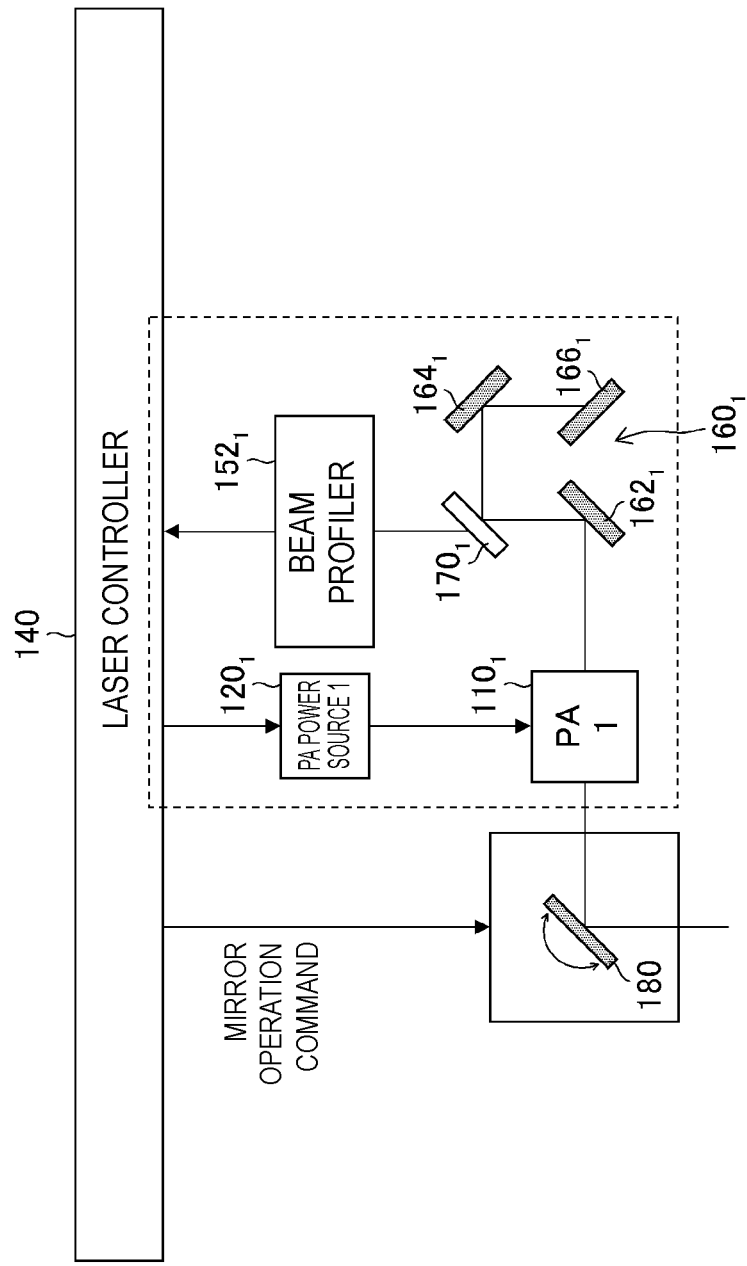
FIG. 11 is a configuration diagram illustrating an example in which a beam profiler is used for beam detection in the first embodiment.

FIG. 11 is a configuration diagram illustrating an example in which a beam profiler is used for beam detection in the first embodiment. Although FIG. 11 illustrates a part including the first amplifier $110_1$, the second and following amplifiers can have the same configuration.

The laser apparatus 14 includes an actuator-driven mirror 180 on the laser beam path before the amplifier $110_1$. The laser apparatus 14 also includes a beam profiler $152_1$ on the laser beam path after the amplifier $110_1$. The laser beam path before the amplifier $110_1$ is the laser beam path upstream of the amplifier $110_1$ on the incident side on which a laser beam is introduced to the amplifier $110_1$. The laser beam path after the amplifier $110_1$ is the laser beam path downstream of the amplifier $110_1$ on the emission side on which a laser beam amplified by the amplifier $110_1$ is output. The beam profiler $152_1$ is an exemplary sensor $150_1$ illustrated in FIG. 10.

The beam profiler $152_1$ is preferably a thermal infrared detection element. Examples of thermal infrared detection elements preferable as the beam profiler $152_1$ include a pyroelectric sensor and a micro bolometer.

The actuator-driven mirror 180 is connected with the laser controller 140. The laser controller 140 can transmit a mirror operation command to the actuator-driven mirror 180. The actuator-driven mirror 180 is driven based on the mirror operation command. The traveling direction of a pulse laser beam incident on the amplifier $110_1$ can be adjusted by adjusting the angle of the actuator-driven mirror 180.

6.2 Operation

Light having transmitted through the beam splitter $170_1$ is projected onto the light-receiving surface of the beam profiler $152_1$ through a lens (not illustrated). The beam profiler $152_1$ outputs a signal in accordance with the amount of received light. The signal obtained from the beam profiler $152_1$ is processed to measure a beam profile. The beam profile includes the intensity profile and position of a beam section. Light reflected by the beam splitter $170_1$ is reflected by the second mirror $164_1$ and the third mirror $166_1$ and then travels to the next amplifier.

The laser controller 140 acquires data from the beam profiler $152_1$. The beam profiler $152_1$ can provide, to the laser controller 140, light amount data indicating two-dimensional intensity distribution of a laser beam projected onto the light-receiving surface. In the burst duration, the laser controller 140 analyzes the beam position based on the data obtained from the beam profiler $152_1$, and performs feedback control to output the mirror operation command to the actuator-driven mirror 180 to decrease the amount of deviation of the beam position from a target position.

In the burst stop duration, the laser controller 140 determines beam existence based on the light amount data obtained from the beam profiler $152_1$, and determines that self-oscillation is occurring when the beam existence determination is positive.

Figure 12:
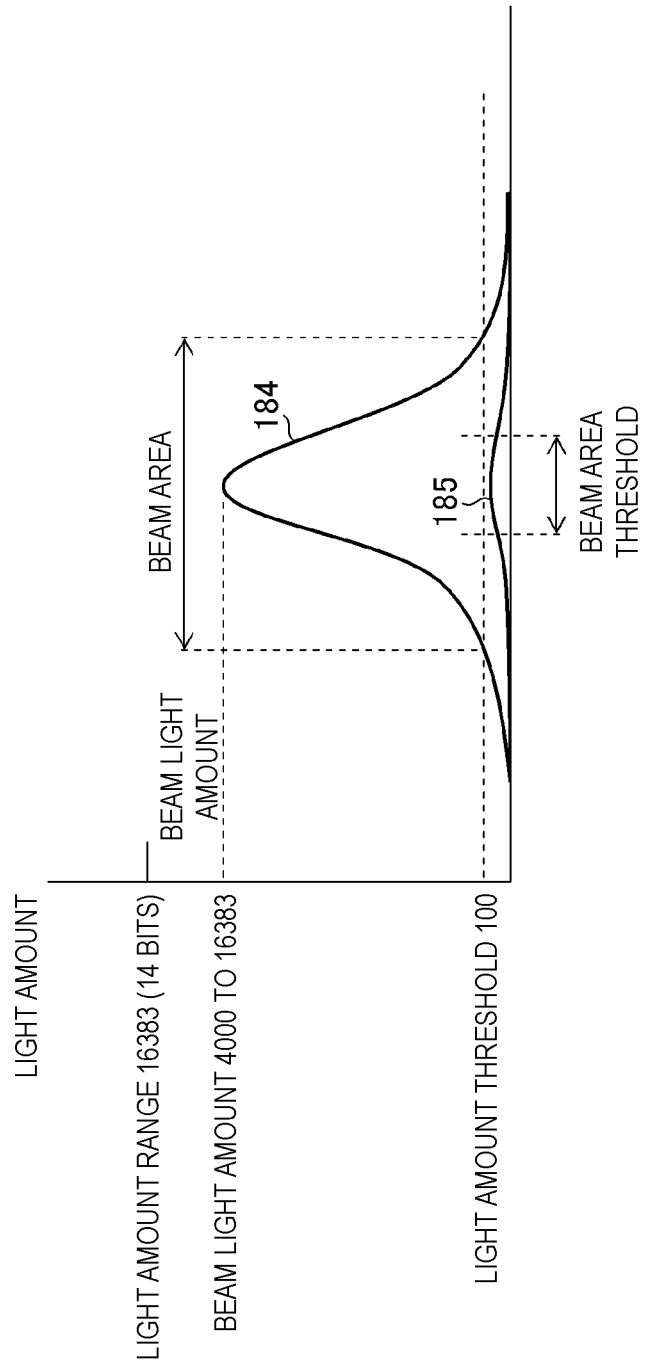
FIG. 12 is an explanatory diagram of signal processing performed by the beam profiler to detect beam existence.

FIG. 12 is an explanatory diagram of signal processing performed to detect beam existence through the beam profiler. FIG. 12 illustrates an exemplary section of the intensity profile obtained from the beam profiler. In FIG. 12, the horizontal axis represents the position, and the vertical axis represents the light amount.

When the range of light amount can be detected by the beam profiler is, for example, 14 bits (0 to 16383), the beam light amount detected by the beam profiler in the burst duration is a digital value in the range of 4000 to 16383 approximately.

The light amount of self-oscillation light when self-oscillation occurs in the burst stop duration is smaller than the beam light amount detected in the burst duration. A light amount threshold and a beam area threshold as references for the beam existence determination are set in advance based on the intensity profile obtained from the beam profiler. The beam existence determination may be positive when the light amount detected by the beam profiler is equal to or larger than the light amount threshold and the beam area for the light amount equal to or larger than the light amount threshold is equal to or larger than the beam area threshold.

FIG. 12 illustrates an example in which the light amount threshold is set to be, for example, "100". The light amount threshold for self-oscillation detection in the burst stop duration and the light amount threshold for beam detection in the burst duration may be set to be different from each other. The light amount threshold for self-oscillation detection in the burst stop duration may be set to be smaller than the light amount threshold for beam detection in the burst duration. For example, the light amount threshold for self-oscillation detection in the burst stop duration may be "100", and the light amount threshold in the burst duration may be "500". In FIG. 12, the beam existence determination is positive for an intensity profile indicated by a waveform 184. In FIG. 12, the beam existence determination is negative for an intensity profile indicated by a waveform 185.

7.3 Laser Control Process

Figure 13:
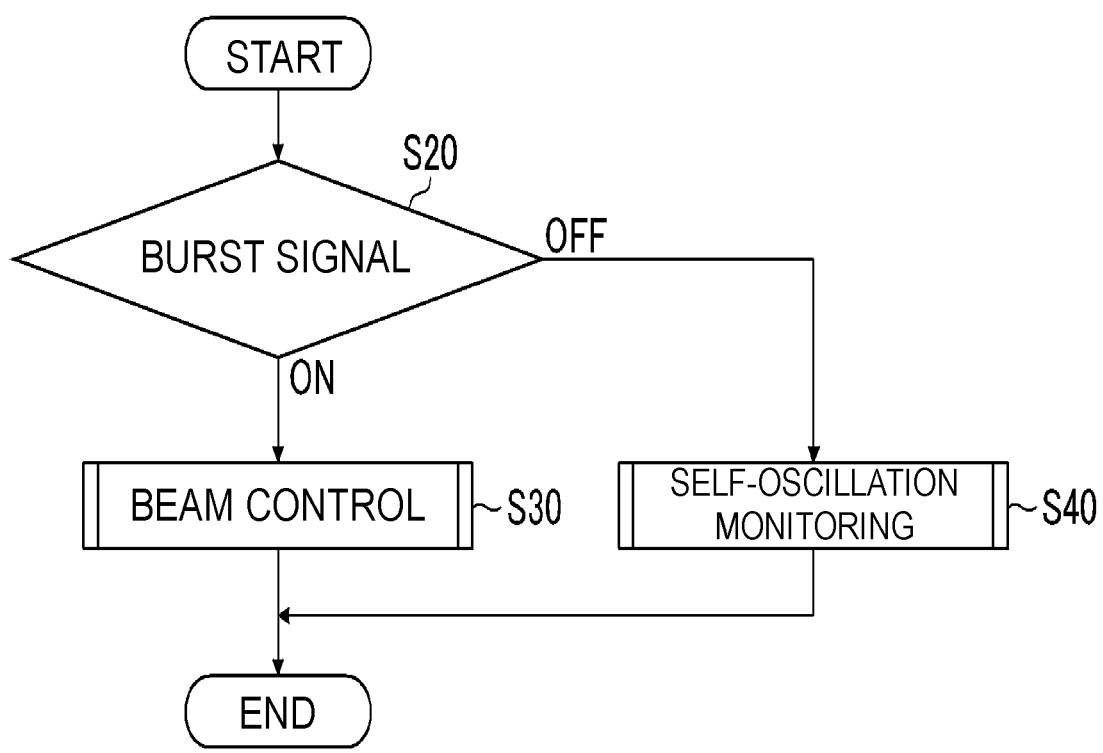
FIG. 13 is a flowchart illustrating exemplary laser control performed by the laser controller.

FIG. 13 is a flowchart illustrating an exemplary laser control process. Each step in the flowchart illustrated in FIG. 13 is executed by the laser controller 140. The laser controller 140 performs switching between beam control (step S30) and self-oscillation monitoring (step S40) in accordance with determination of the burst-on state or burst-off state (step S20) based on a burst signal from the exposure apparatus controller 70. The beam control in the present example includes optical axis control by the actuator-driven mirror 180.

At step S20, the laser controller 140 determines whether the burst signal indicates the burst-on state or the burst-off state. The burst-on state corresponds to the burst duration. The burst-off state corresponds to the burst stop duration.

When the laser controller 140 determines that the burst-on state is indicated at step S20, the laser controller 140 proceeds to step S30.

Figure 14:
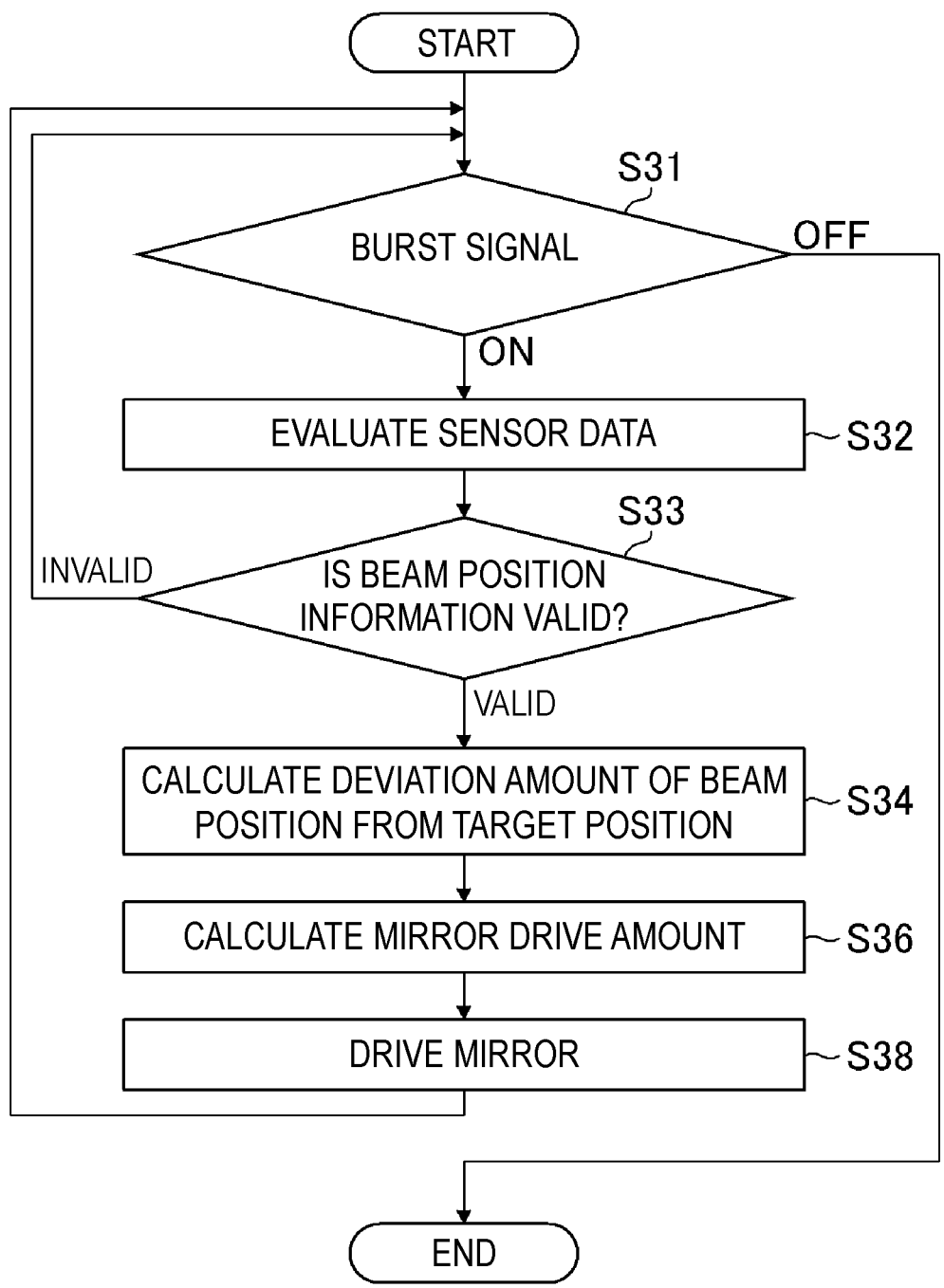
FIG. 14 is a flowchart illustrating an exemplary optical axis control process performed in a burst duration.

At step S30, the laser controller 140 performs the optical axis control as exemplary beam control. The optical axis control will be described later with a specific example (FIG. 14).

When the laser controller 140 determines that the burst-off state is indicated at step S20, the laser controller 140 proceeds to step S40.

Figure 15:
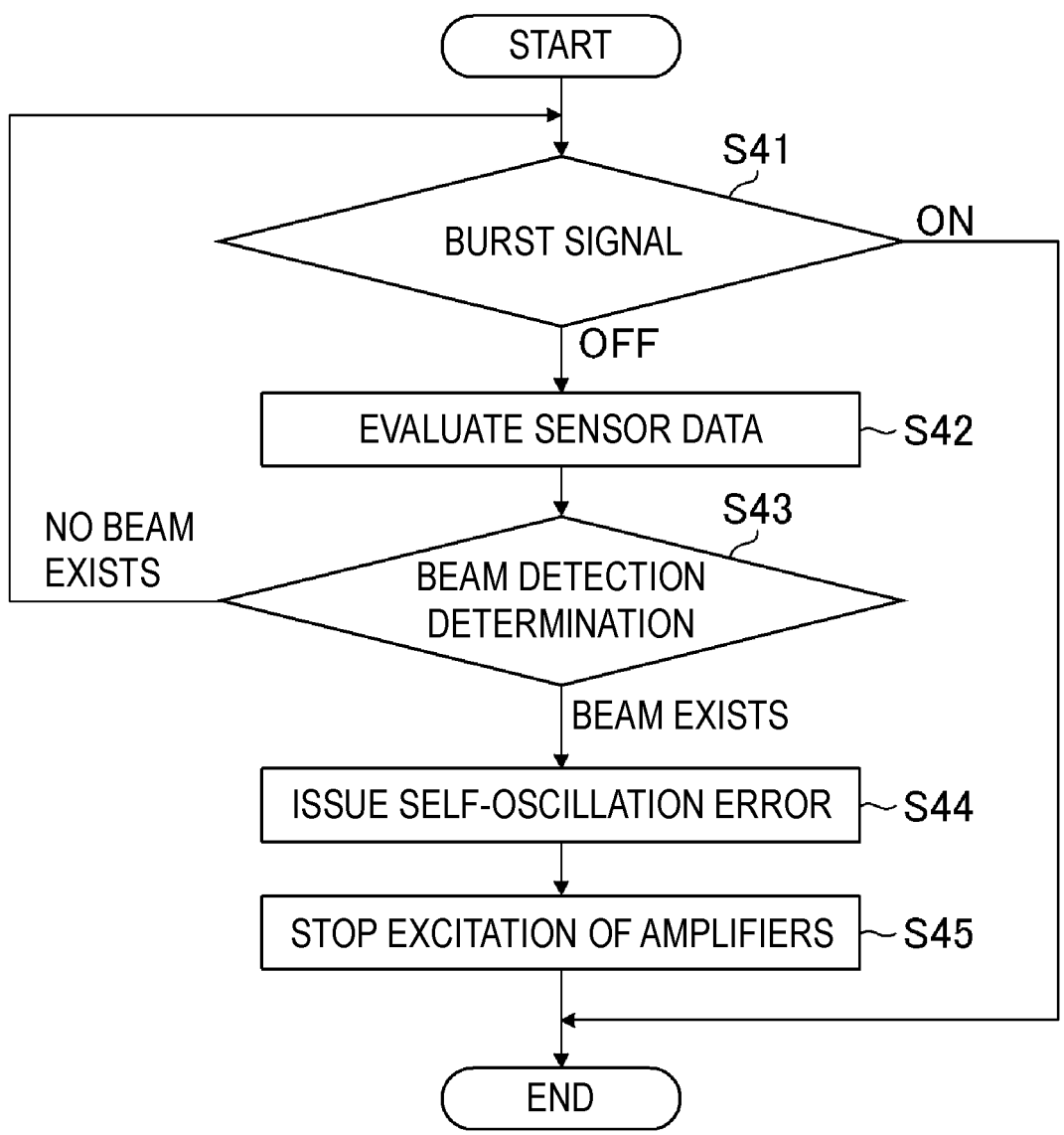
FIG. 15 is a flowchart illustrating an exemplary self-oscillation monitoring process performed in a burst stop duration.

At step S40, the laser controller 140 performs the self-oscillation monitoring processing. The self-oscillation monitoring processing will be described later with a specific example (FIG. 15).

As illustrated in FIG. 13, the laser apparatus 14 according to the present disclosure performs switching between the optical axis control as laser beam parameter control and the self-oscillation monitoring processing in response to the on-off switching of the burst signal.

6.3.1 Optical Axis Control Process

FIG. 14 is a flowchart illustrating an exemplary optical axis control process performed in the burst duration. Each step in the flowchart illustrated in FIG. 14 is executed by the laser controller 140. Before detailed description of the steps, the optical axis control process illustrated in FIG. 14 will be described in outline.

In the burst-on state, the laser controller 140 evaluates sensor data from the beam profiler (step S32), and determines whether beam position information is valid (step S33). The laser controller 140 uses the light amount threshold and the beam area threshold set in advance to determine whether the beam area with the beam light amount equal to or larger than the light amount threshold is equal to or larger than the beam area threshold.

When the beam position information is valid, the laser controller 140 calculates the amount of deviation of the current beam position from a target position (step S34), and calculates a mirror drive amount from the deviation amount (step S36). Then, the laser controller 140 commands drive of the actuator-driven mirror based on the calculated mirror drive amount (step S38). When the burst signal becomes the burst-off state while the processing at steps S32 to S38 is repeated in the burst duration, the optical axis control process illustrated in FIG. 14 ends.

The following describes details of each step in the flowchart illustrated in FIG. 14. At step S31, the laser controller 140 determines whether the burst signal indicates the burst-on state or the burst-off state. The processing at step S31 may be the determination processing at step S20 in FIG. 13.

When the laser controller 140 determines that the burst-on state is indicated at step S31, the laser controller 140 proceeds to step S32.

At step S32, the laser controller 140 evaluates the sensor data from the beam profiler. The light amount threshold and the beam area threshold used for the sensor data evaluation are set to the laser controller 140, (refer to FIG. 12). The laser controller 140 compares the light amount detected by the beam profiler against the light amount threshold, and calculates the beam area with the light amount equal to or larger than the light amount threshold. In addition, the laser controller 140 compares the beam area with the light amount equal to or larger than the light amount threshold against the beam area threshold, and evaluates whether the beam area is equal to or larger than the beam area threshold. In addition, the laser controller 140 performs processing of specifying, from the sensor data, a beam position as the central position of a beam section having a light amount equal to or larger than the light amount threshold.

At step S33, the laser controller 140 determines whether the beam position information of the beam profiler is valid based on a result of the beam data evaluation processing at step S32. The laser controller 140 determines that the beam position information is valid when the light amount detected by the beam profiler is equal to or larger than the light amount threshold and the beam area with the light amount equal to or larger than the light amount threshold is equal to or larger than the beam area threshold.

When the laser controller 140 determines the beam position information is invalid at step S33, the laser controller 140 returns to step S31.

When the laser controller 140 determines that the beam position information is valid at step S33, the laser controller 140 proceeds to step S34.

At step S34, the laser controller 140 calculates the amount of deviation of the beam position measured from the sensor data from the target position.

At step S36, the laser controller 140 calculates the mirror drive amount based on the deviation amount calculated through the processing at step S34.

At step S38, the laser controller 140 drives the actuator-driven mirror in accordance with the mirror drive amount calculated through the processing at step S36. The laser controller 140 returns to step S31 after the processing at step S38, and repeatedly executes the processing at steps S31 to S38 until the burst signal becomes the burst-off state.

When the burst signal becomes the burst-off state at step S31, the laser controller 140 ends the optical axis control process illustrated in FIG. 14.

6.3.2 Self-Oscillation Monitoring Process

FIG. 15 is a flowchart illustrating an exemplary self-oscillation monitoring process performed in the burst stop duration. Each step in the flowchart illustrated in FIG. 15 is executed by the laser controller 140. Before detailed description of the steps, the self-oscillation monitoring process illustrated in FIG. 15 will be described in outline.

In the burst-off state, the laser controller 140 evaluates sensor data from the beam profiler (step S42), and determines that self-oscillation is occurring when the beam existence determination is positive. In this case, the laser controller 140 issues the self-oscillation error indicating the self-oscillation detection (step S44). In addition, the laser controller 140 stops excitation of the amplifiers (step S45). All or some of the amplifier power sources may be stopped.

In the burst-off duration, the processing at steps S42 to S45 is repeated, and when the burst signal becomes the burst-on state, the self-oscillation monitoring process illustrated in FIG. 15 ends.

The following describes details of each step in the flowchart illustrated in FIG. 15. At step S41, the laser controller 140 determines whether the burst signal indicates the burst-on state or the burst-off state. The processing at step S41 may be common to the determination processing at step S20 in FIG. 13.

When the laser controller 140 determines that the burst-off state is indicated at step S41, the laser controller 140 proceeds to step S42.

At step S42, the laser controller 140 evaluates the sensor data from the beam profiler. The light amount threshold and the beam area threshold used for the sensor data evaluation are set to the laser controller 140 (refer to FIG. 12). The laser controller 140 compares the light amount detected by the beam profiler against the light amount threshold, and calculates the beam area with the light amount equal to or larger than the light amount threshold. In addition, the laser controller 140 compares the beam area with the light amount equal to or larger than the light amount threshold against the beam area threshold, and evaluates whether the beam area is equal to or larger than the beam area threshold.

The light amount threshold and the beam area threshold applied to the processing at step S42 may be set to be same as or different from the light amount threshold and the beam area threshold applied to the processing at step S32 in FIG. 14.

At step S43, the laser controller 140 performs beam detection determination of whether a beam is detected based on a result of the beam data evaluation processing at step S42. The laser controller 140 determines that a beam exists when the light amount detected by the beam profiler is equal to or larger than the light amount threshold and the beam area with the light amount equal to or larger than the light amount threshold is equal to or larger than the beam area threshold.

When the laser controller 140 determines that no beam exists at step S43, the laser controller 140 returns to step S41.

When the laser controller 140 determines that a beam exists at step S43, the laser controller 140 proceeds to step S44.

At step S44, the laser controller 140 issues the self-oscillation error as error information indicating the self-oscillation detection.

At step S45, the laser controller 140 stops excitation of the amplifiers. Specifically, the laser controller 140 stops all or some of the amplifier power sources. The processing at step S45 prevents occurrence of self-oscillation.

After the processing at step S45, the laser controller 140 ends the self-oscillation monitoring process illustrated in FIG. 15. Alternatively, when the burst signal becomes the burst-on state at step S41, the laser controller 140 ends the self-oscillation monitoring process illustrated in FIG. 15.

6.4 Relation Between Burst Command and Beam Detection

Figure 16:
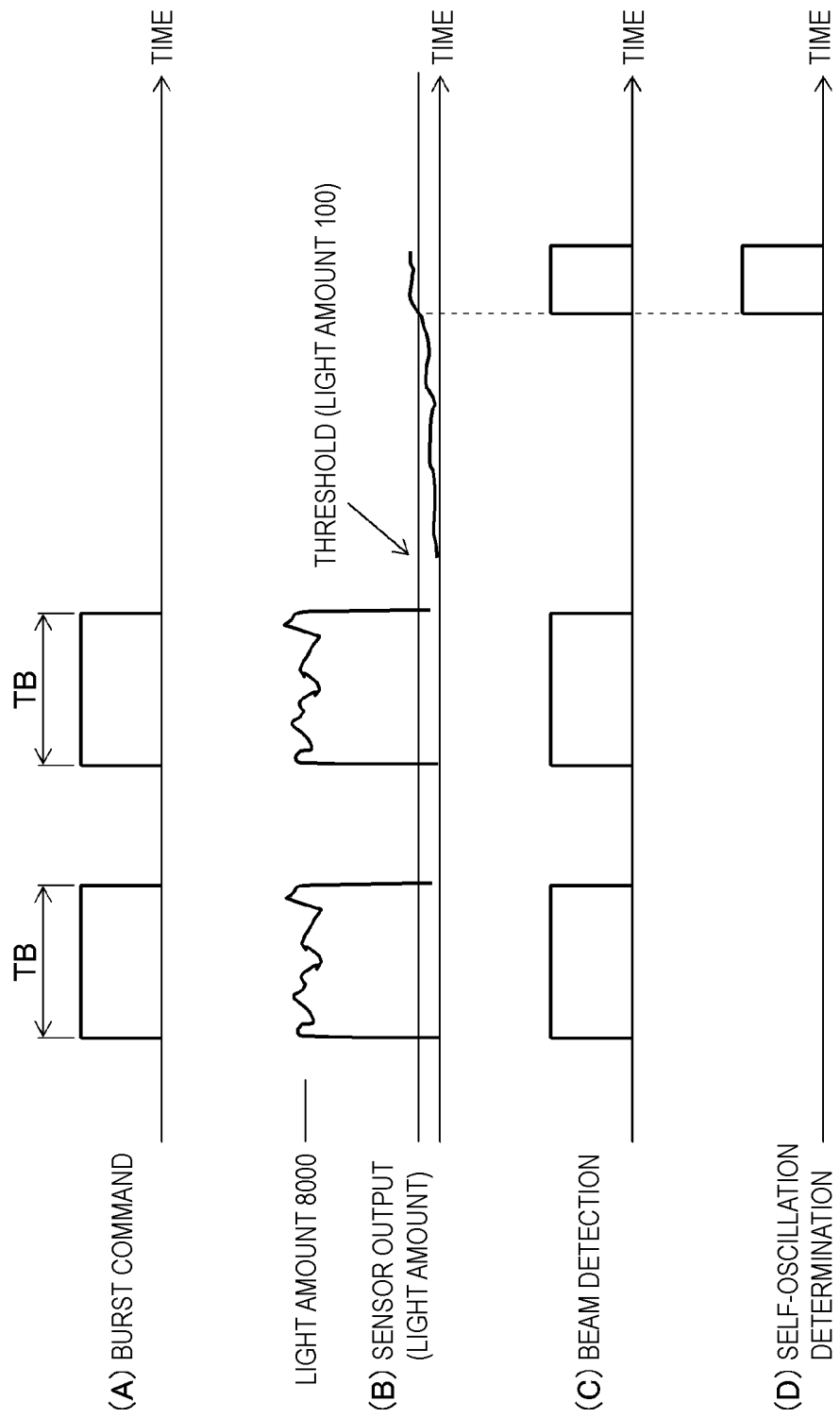
FIG. 16 is a timing chart illustrating the relation between a burst command provided to the laser apparatus and beam detection performed by the beam profiler.

FIG. 16 is a timing chart illustrating the relation between a burst command provided to the laser apparatus and beam detection by the beam profiler.

Signal (A) illustrated in the uppermost part in FIG. 16 is a signal of the burst command. Signal (B) illustrated in the second uppermost part in FIG. 16 is an exemplary signal of the sensor output obtained from the beam profiler. Signal (C) illustrated in the third uppermost part in FIG. 16 is an exemplary signal of beam detection when the beam existence determination is positive through evaluation of the light amount threshold and the beam area threshold. In FIG. 16, the light amount threshold is set to be 100.

Signal (D) illustrated in the lowermost part in FIG. 16 is an exemplary signal of self-oscillation determination based on the beam detection signal (C).

In FIG. 16, when the burst command is on, the sensor output indicates, for example, a light amount of 8000 approximately, and a beam is detected. When the sensor output becomes equal to or larger than the light amount threshold while the burst command is off, the beam existence determination is positive, and a beam is detected. When a beam is detected while the burst command is on, the laser controller 140 determines that the beam is attributable to normal burst oscillation in the burst duration.

When a beam is detected while the burst command is off, the laser controller 140 determines that self-oscillation is occurring in the burst stop duration.

6.5 Effects

With the configuration of the first embodiment described with reference to FIGS. 10 to 16, self-oscillation detection in the burst stop duration is possible by using the system of optical axis feedback control for adjusting the optical axis of a laser beam. The beam profiler has a sufficiently fast reaction speed of several tens milliseconds and a wide dynamic range, and thus is capable of performing detection from low-output self-oscillation light.

In the first embodiment, a pulse laser beam output from each of the amplifiers $110_1$ to $110_4$ corresponds to an exemplary "second pulse laser beam". The processing of controlling the optical axis through the laser controller 140 in accordance with the optical axis control process illustrated in FIG. 14 corresponds to exemplary "beam parameter control" processing. The processing of detecting self-oscillation light through the laser controller 140 in accordance with the self-oscillation monitoring process in FIG. 15 corresponds to exemplary processing of "detecting self-oscillation light from an amplifier based on a sensor output signal obtained from a sensor in the burst stop duration". The EUV light generation control system 40 corresponds to an exemplary "control system".

7. Second Embodiment 7.1 Configuration

In a second embodiment, an energy sensor is used in place of the beam profiler in the first embodiment. The following describes differences from the first embodiment.

Figure 17:
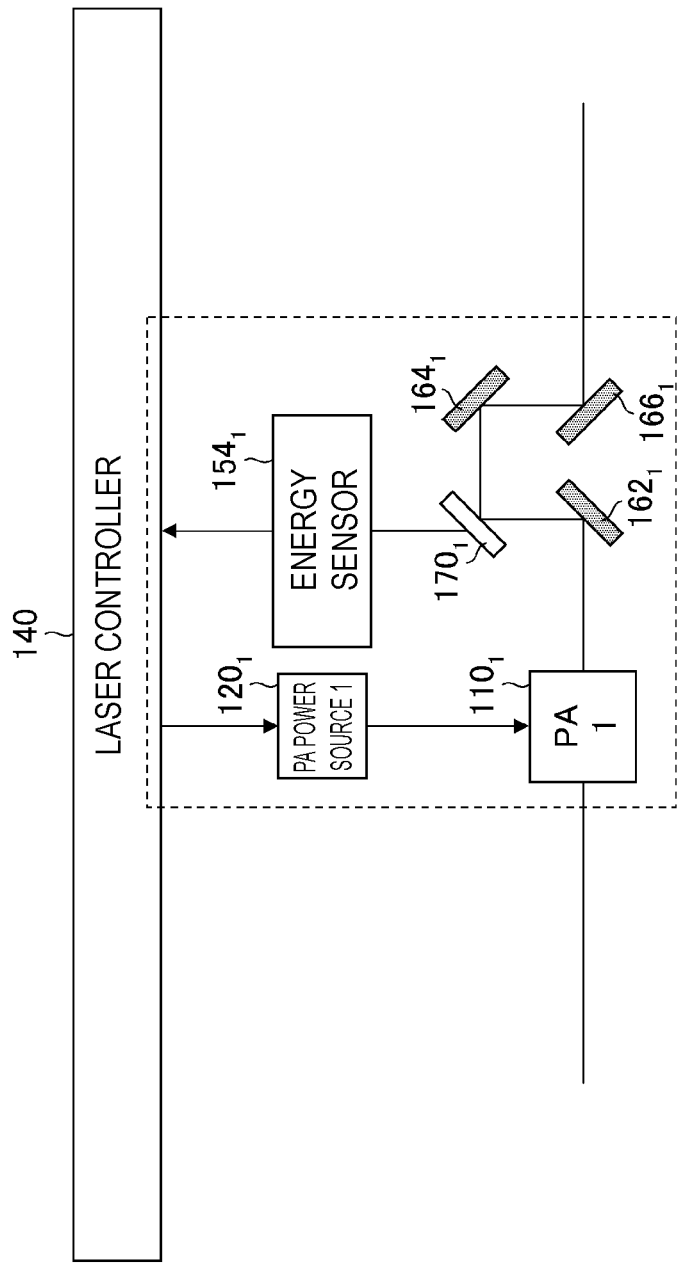
FIG. 17 is a configuration diagram illustrating an example in which an energy sensor is used for beam detection in a second embodiment.

FIG. 17 is a configuration diagram illustrating an example in which an energy sensor is used for laser beam detection. Although FIG. 17 illustrates a part including the first amplifier $110_1$, the second and following amplifiers can have the same configuration.

The laser apparatus 14 includes an energy sensor $154_1$ on the laser beam path after the amplifier $110_1$. The energy sensor $154_1$ may be, for example, a photoelectric element.

Figure 18:
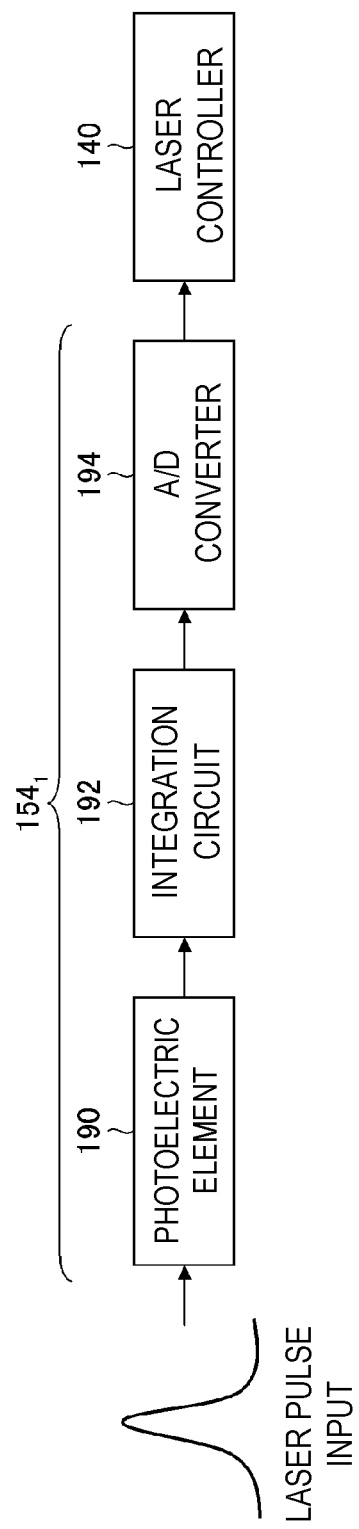
FIG. 18 is a block diagram illustrating an exemplary configuration of the energy sensor.

FIG. 18 is a block diagram illustrating an exemplary configuration of the energy sensor. The energy sensor $154_1$ includes a photoelectric element 190, an integration circuit 192, and an A/D converter 194.

7.2 Operation

When a laser pulse is input to the energy sensor $154_1$, electromotive force occurs at the photoelectric element 190. The integration circuit 192 integrates voltage generated at the photoelectric element 190. The A/D converter 194 converts an analog signal obtained from the integration circuit 192 into a digital signal.

The energy sensor $154_1$ transmits, to the laser controller 140, an energy value converted from the voltage generated at the photoelectric element 190 through the integration circuit 192 and the A/D converter 194.

The laser controller 140 acquires data from the energy sensor $154_1$. The laser controller 140 determines that a beam exists when the integrated value of detection energy obtained from the energy sensor $154_1$ is equal to or larger than a threshold. The integrated value of detection energy is referred to as an "energy integrated value".

Figure 19:
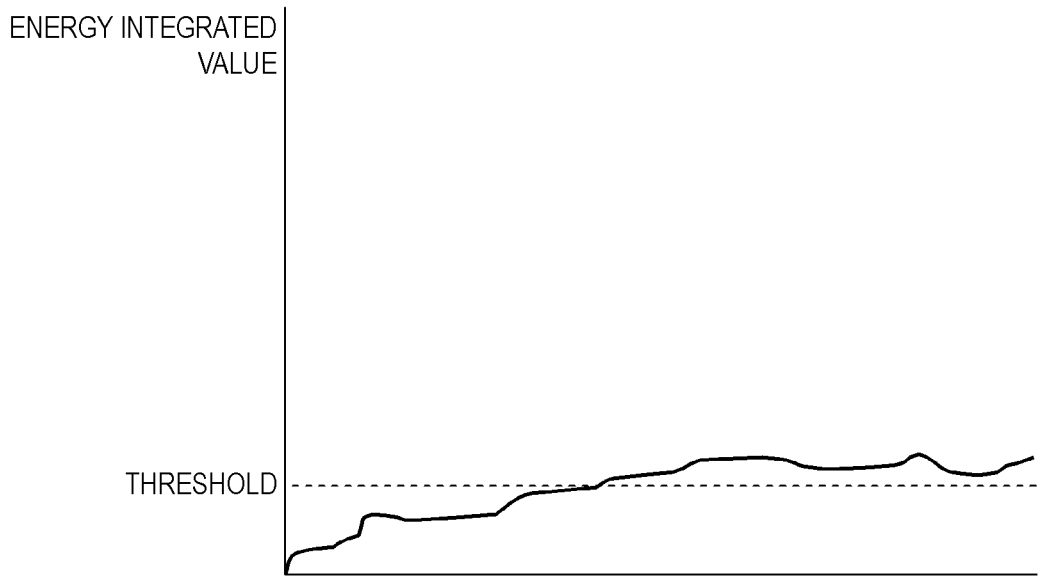
FIG. 19 is a graph illustrating an exemplary energy integrated value obtained by integrating a sensor output from the energy sensor.

FIG. 19 is an explanatory diagram of signal processing performed to detect beam existence through the energy sensor. FIG. 19 illustrates an exemplary energy integrated value obtained by integrating a sensor output from the energy sensors. In FIG. 19, the horizontal axis represents time, and the vertical axis represents the energy integrated value. Processing of calculating the energy integrated value is similar to processing of calculating moving average. The energy integrated value is obtained by integrating, over one latest duration, data of the sensor output acquired in a temporally sequential manner. For example, the energy integrated value illustrated in FIG. 19 is an integrated value of the temporally sequential data obtained from the energy sensor over the latest one second. Thus, the energy integrated value can decrease.

A threshold as a reference for the beam existence determination is set to the laser controller 140 in advance. The laser controller 140 integrates the sensor output from the energy sensor, and determines that a beam exists when the energy integrated value is equal to or larger than the threshold.

In the burst duration, the laser controller 140 performs feedback control to output a discharge command to the amplifier power source $120_1$ to decrease the amount of deviation of an energy measured value by the energy sensor $154_1$ from an energy target value.

In the burst stop duration, the laser controller 140 performs beam existence determination based on the output from the energy sensor $154_1$, and determines that self-oscillation is occurring when the beam existence determination is positive.

7.3 Laser Control Process

Figure 20:
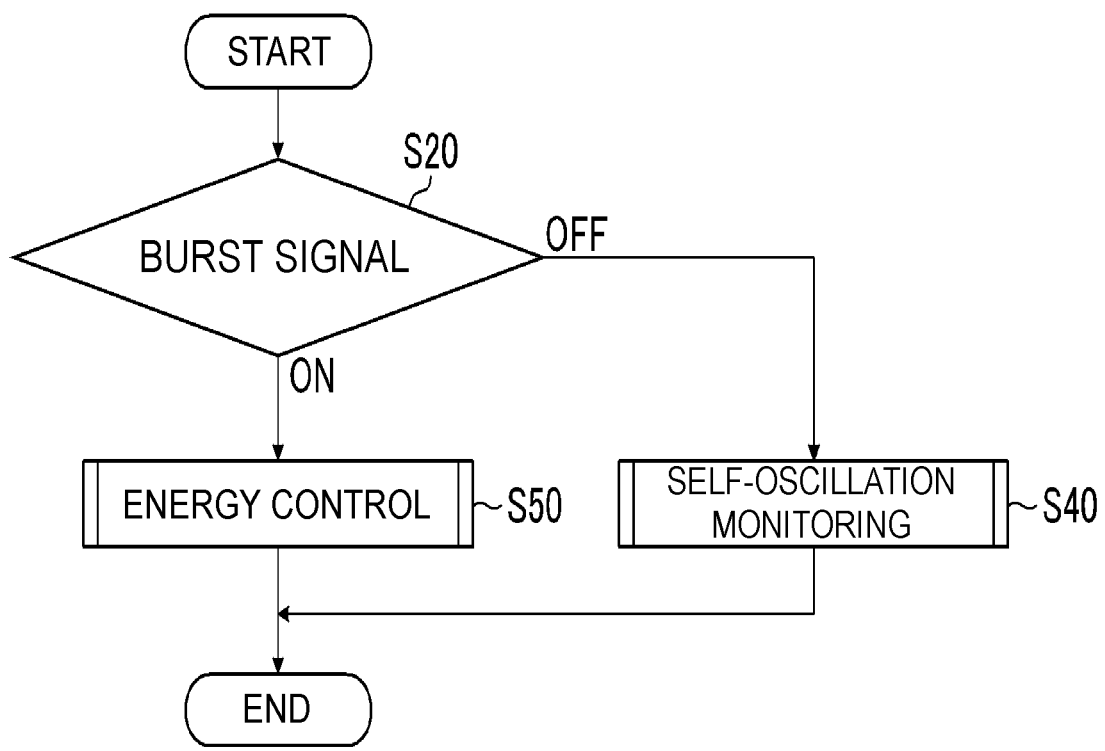
FIG. 20 is a flowchart illustrating an exemplary laser control process applied to the second embodiment.

FIG. 20 is a flowchart illustrating an exemplary laser control process applied to the second embodiment. Each step in the flowchart illustrated in FIG. 20 is executed by the laser controller 140. In FIG. 20, any step identical or similar to a step of the laser control process described with reference to FIG. 13 is denoted by an identical step number, and description thereof will be omitted.

In the laser control process illustrated in FIG. 20, processing of energy control (step S50) is executed in place of step S30 in FIG. 13. Specifically, when the laser controller 140 determines that the burst-on state is indicated at step S20, the laser controller 140 proceeds to step S50.

At step S50, the laser controller 140 performs energy control as exemplary beam control.

As illustrated in FIG. 20, the laser apparatus 14 according to the second embodiment performs switching between the energy control as laser beam parameter control and the self-oscillation monitoring processing in response to on-off switching of the burst signal.

7.3.1 Energy Control Process

Figure 21:
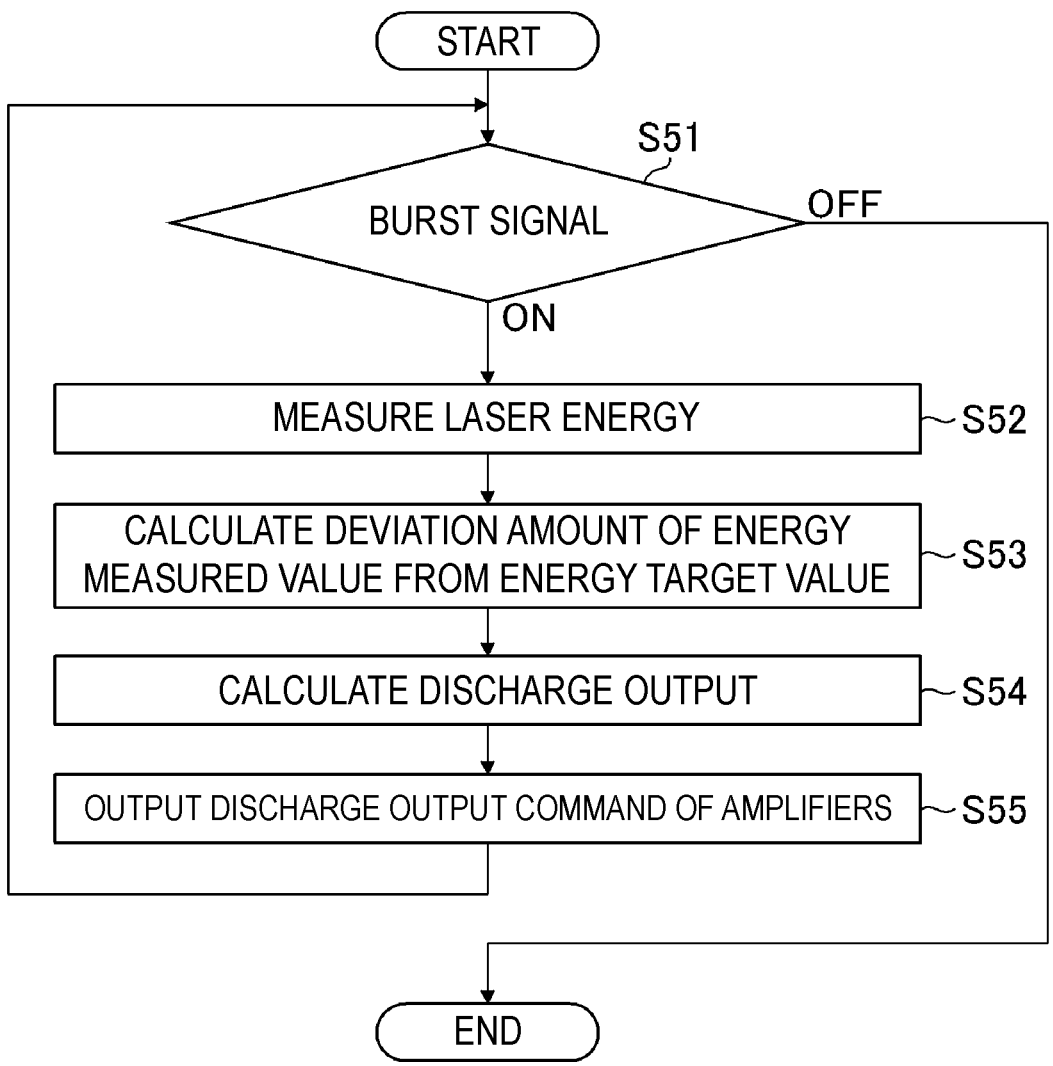
FIG. 21 is a flowchart illustrating an exemplary energy control process performed in the burst duration.

FIG. 21 is a flowchart illustrating an exemplary energy control process performed in the burst duration. Each step in the flowchart illustrated in FIG. 21 is executed by the laser controller 140. Before detailed description of the steps, the energy control process illustrated in FIG. 21 will be described in outline.

In the burst-on state, the laser controller 140 measures laser energy (step S52). Then, the laser controller 140 calculates the amount of deviation of the energy measured value from an energy target value (step S53), and calculates a discharge output based on the deviation amount (step S54). Then, the laser controller 140 outputs a discharge output command to each amplifier based on a calculation result of the discharge output (step S55). The discharge output command may be output separately to each amplifier, or the energy may be measured by the last amplifier and the discharge output command may be output to the amplifiers.

When the burst signal becomes the burst-off state while the processing at steps S52 to S55 is repeated in the burst duration, the energy control process illustrated in FIG. 21 ends.

The following describes details of each step in the flowchart illustrated in FIG. 21. At step S51, the laser controller 140 determines whether the burst signal indicates the burst-on state or the burst-off state. The processing at step S51 may be the determination processing at step S20 in FIG. 13.

When the laser controller 140 determines that the burst-on state is indicated at step S51, the laser controller 140 proceeds to step S52.

At step S52, the laser controller 140 acquires data from the energy sensor, and measures laser energy.

At step S53, the laser controller 140 calculates the amount of deviation of the energy value measured at step S52 from an energy target value.

At step S54, the laser controller 140 calculates a discharge output based on the deviation amount calculated through the processing at step S53. The laser controller 140 controls the discharge output to decrease the amount of deviation of the energy measured value from the energy target value.

At step S55, the laser controller 140 outputs a discharge output command to each amplifier power source in accordance with the discharge output calculated through the processing at step S54.

The laser controller 140 returns to step S51 after the processing at step S55, and repeatedly executes the processing at steps S51 to S55 until the burst signal becomes the burst-off state. In this manner, feedback control of the discharge output command is performed based on the sensor output from the energy sensor in the burst duration.

When the burst signal becomes the burst-off state at step S51, the laser controller 140 ends the energy control process illustrated in FIG. 21.

7.3.2 Self-Oscillation Monitoring Process

The self-oscillation monitoring process performed in the burst stop duration in the second embodiment may be same as that of the flowchart described with reference to FIG. 15.

In the self-oscillation monitoring process in the second embodiment, the output from the energy sensor is integrated at step S42 in FIG. 15. Then, at step S43, it is determined whether the energy integrated value is equal to or larger than a threshold. The beam existence determination is positive when the energy integrated value is equal to or larger than the threshold.

7.4 Effects

With the configuration of the second embodiment, self-oscillation detection is possible in the burst stop duration by using the system of measuring the energy of a laser beam and executing energy control.

In the second embodiment, the processing performed by the laser controller 140 to control the discharge output to each amplifier in accordance with the energy control process illustrated in FIG. 21 corresponds to exemplary "processing of controlling a beam parameter". The beam energy of a pulse laser beam output from each amplifier is controlled by controlling the discharge output to the amplifier. Thus, the beam parameter controlled in accordance with the energy control process corresponds to the output energy of a pulse laser beam.

8. Modification 1

In the first and second embodiments, the optical shutter 103 is opened and closed in response to the burst command, but the optical shutter 103 may be omitted. For example, an oscillation trigger may be output from the laser controller 140 to the master oscillator 102 in response to the burst command, and outputting of a pulse laser beam from the master oscillator 102 may be stopped in the burst stop duration.

9. Modification 2

The excitation intensity of each amplifier may be controlled to weaken the excitation intensity of the amplifier in the burst stop duration as compared to the excitation intensity of the amplifier in the burst duration. The occurrence of self-oscillation can be prevented by weakening the excitation intensity of the amplifier. The excitation intensity of the amplifier may be controlled in response to the burst signal in addition to the self-oscillation monitoring function described in the first and second embodiments.

Figure 22:
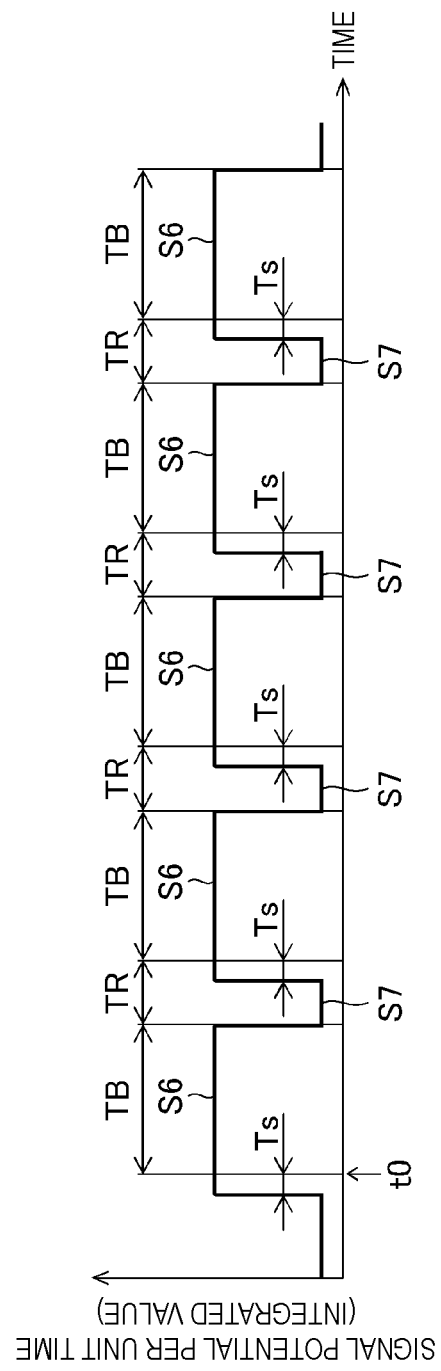
FIG. 22 is a timing chart illustrating exemplary strong and weak excitation signals input to an amplifier power source from the laser controller.

FIG. 22 is a timing chart illustrating an exemplary strong excitation signal S6 and an exemplary weak excitation signal S7 input from the laser controller 140 to the amplifier power sources $120_1$ to $120_4$ of the amplifiers $110_1$ to $110_4$. As illustrated in FIG. 22, the laser controller 140 may input the strong excitation signal S6 to the amplifier power sources $120_1$ to $120_4$ while the burst allowing signal S1 is input from the exposure apparatus controller 70 through the EUV light generation control system 40.

The amplifier power sources $120_1$ to $120_4$ each input high frequency voltage for strong excitation to the amplifiers $110_1$ to $110_4$ in accordance with the strong excitation signal S6. The rise timing of the burst-on signal S3 may be delayed from the rise timing of the strong excitation signal S6 by the predetermined time Ts.

10. Amplifier Excitation Intensity Control Scheme

The following describes control of the excitation intensity of each amplifier. Examples of control schemes for the excitation intensity include a pulse width modulation (PWM) scheme, a potential control scheme, and a combination of these schemes.

10.1 PWM Scheme

The PWM scheme is a modulation scheme in which the duty ratio of a voltage pulse is changed. The laser controller 140 may change the duty ratios of voltage pulses supplied from the amplifier power sources $120_1$ to $120_4$ to the amplifiers $110_1$ to $110_4$ between strong excitation control and weak excitation control. The duty ratio means the ratio of the pulse width relative to one period when periodic pulsed wave is output, and is given by Expression (1) below.

$$D = \tau/T \quad (1)$$

In Expression (1), D represents the duty ratio, $\tau$ represents the pulse width, and T represents the temporal length of one period. For example, when the period T is 10 microseconds [μs] and the pulse width $\tau$ is one microsecond [μs], the duty ratio D is calculated to be 0.1 (10%) by Expression (1).

Figure 23:
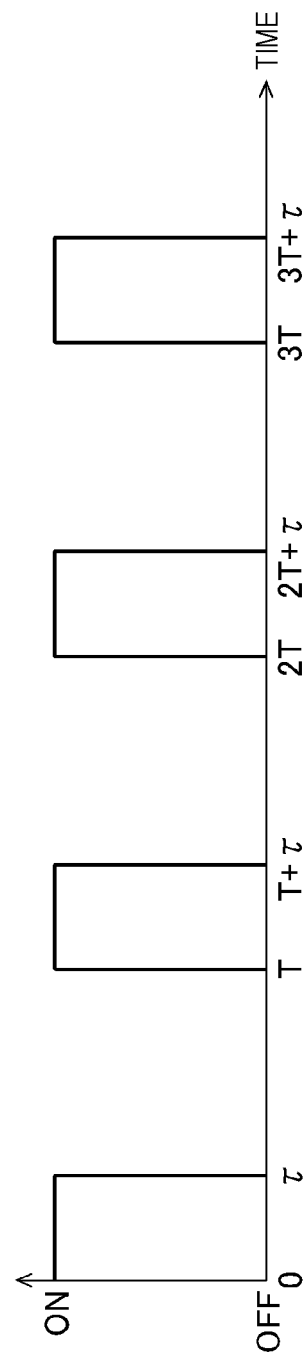
FIG. 23 is a diagram illustrating an exemplary excitation signal input to the amplifier power source from the laser controller when a duty ratio is τ/T.
Figure 24:
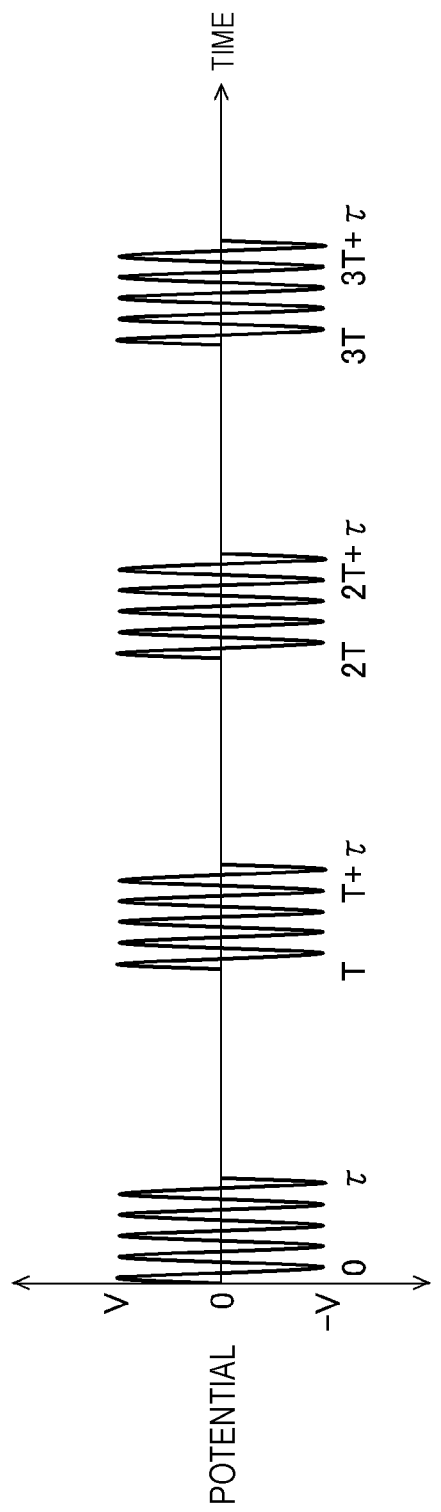
FIG. 24 is a diagram illustrating an exemplary excitation voltage supplied to the amplifier from the amplifier power source based on the excitation signal illustrated in FIG. 23.

FIG. 23 illustrates an exemplary excitation signal (S6 or S7) input to the amplifier power sources $120_1$ to $120_4$ from the laser controller 140 when the duty ratio is $\tau/T$. FIG. 24 illustrates an exemplary excitation voltage supplied from the amplifier power sources $120_1$ to $120_4$ to the amplifiers $110_1$ to $110_4$ in a case of the excitation signal illustrated in FIG. 23. As illustrated in FIG. 23, in the PWM scheme, for example, a square wave signal may be input from the laser controller 140 to the amplifier power sources $120_1$ to $120_4$. Accordingly, an intermittent RF voltage as illustrated in FIG. 24 is supplied from the amplifier power sources $120_1$ to $120_4$ to the amplifiers $110_1$ to $110_4$.

Figure 25:
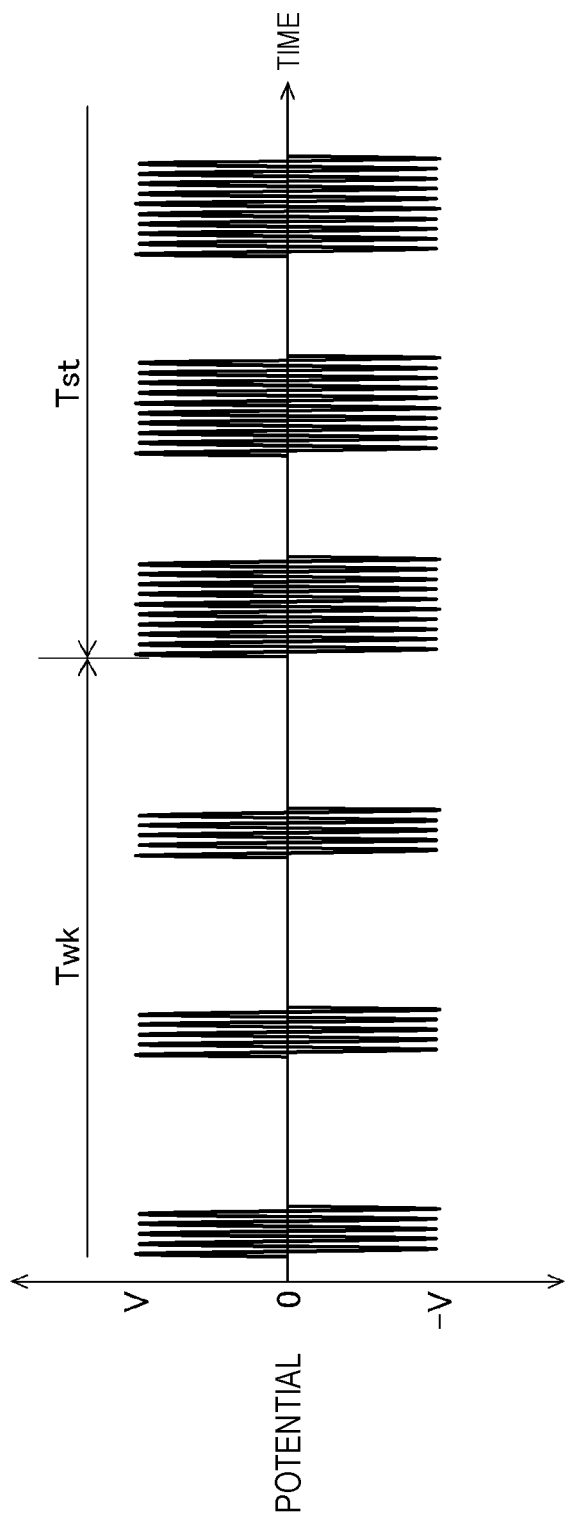
FIG. 25 is a diagram illustrating an exemplary high frequency voltage supplied to the amplifier from the amplifier power source based on excitation intensity control by a pulse width modulation (PWM) scheme.

In the PWM scheme, the weak excitation control and the strong excitation control can be achieved by, for example, changing the duty ratio of a square wave. FIG. 25 is a diagram illustrating an RF voltage supplied from the amplifier power sources $120_1$ to $120_4$ to the amplifiers $110_1$ to $110_4$ when a duty ratio specified by the weak excitation signal S7 in a weak excitation duration Twk is 20% and a duty ratio specified by the strong excitation signal S6 in a strong excitation duration Tst is 50%.

Figure 26:
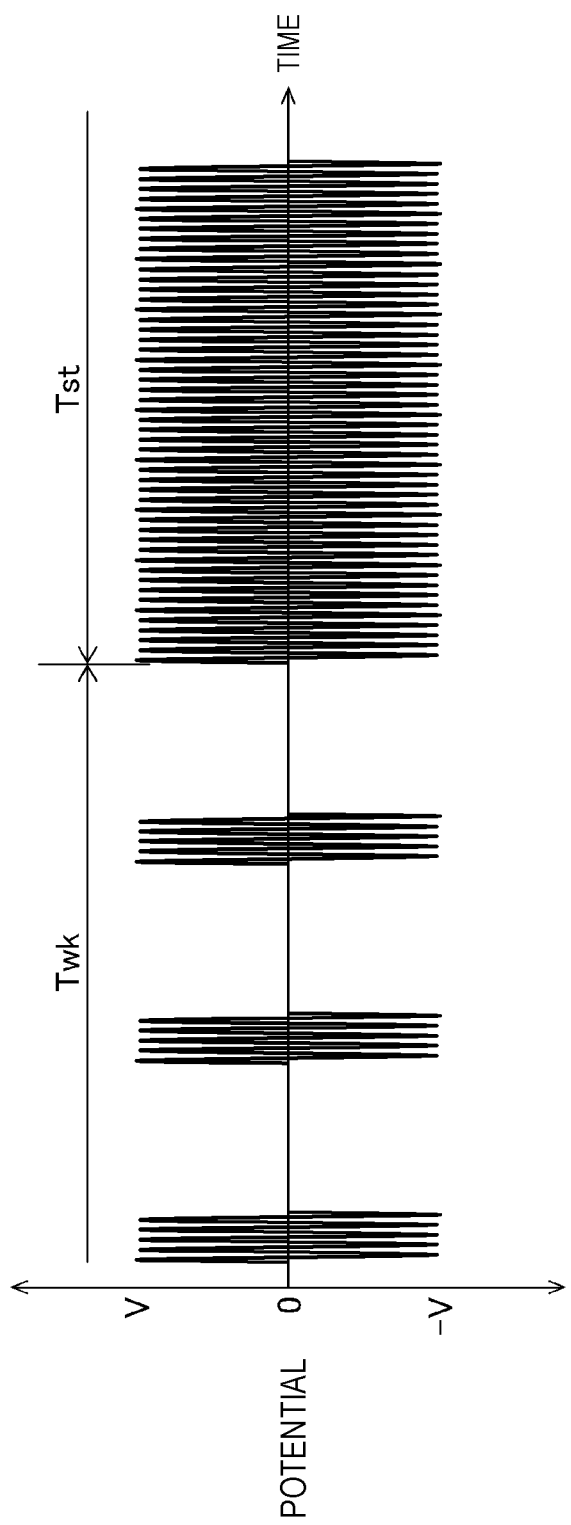
FIG. 26 is a diagram illustrating another exemplary high frequency voltage supplied to the amplifier from the amplifier power source based on excitation intensity control by the PWM scheme.

FIG. 26 is a diagram illustrating an RF voltage supplied from the amplifier power sources $120_1$ to $120_4$ to the amplifiers $110_1$ to $110_4$ when the duty ratio specified by the weak excitation signal S7 in the weak excitation duration Twk is 20% and the duty ratio specified by the strong excitation signal S6 in the strong excitation duration Tst is 100%.

As illustrated in FIGS. 25 and 26, the excitation intensity of a laser medium can be changed by changing the duty ratio of the RF voltage applied between electrodes included in each of the amplifiers $110_1$ to $110_4$. The duty ratio in the weak excitation duration Twk is set to be smaller than the duty ratio in the strong excitation duration Tst. Accordingly, excitation energy supplied to the amplifiers $110_1$ to $110_4$ per unit time in the weak excitation duration Twk is smaller than that in the strong excitation duration Tst.

The RF frequency of an amplifier using $CO_2$ gas as an amplification medium is typically 10 to 100 MHz. For example, when the period T is 10 microseconds [μs] as in the present example, the PWM frequency is 100 kHz (=1/T). In this manner, the PWM frequency is preferably set to be sufficiently smaller than the RF frequency of the amplifier. In addition, the repetition frequency of a pulse laser beam output from the master oscillator 102 may be set to be, for example, 100 kHz in synchronization with the PWM period T.

10.2 Potential Control Scheme

Figure 27:
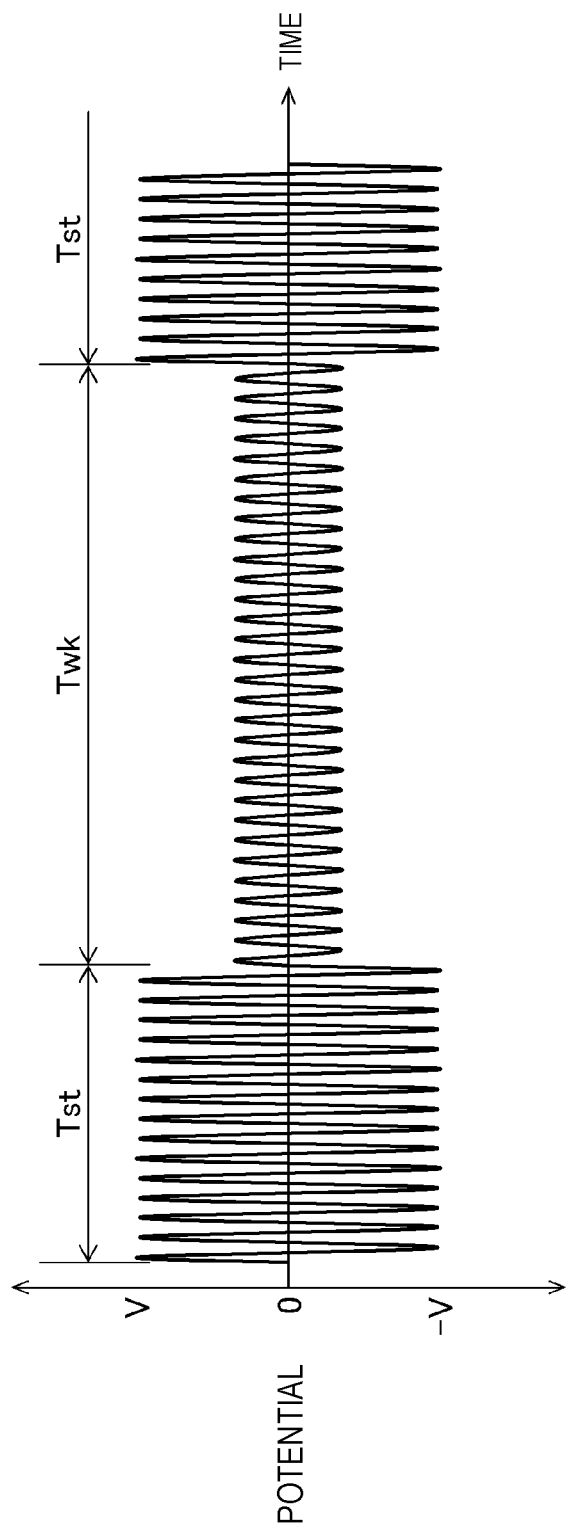
FIG. 27 is a diagram illustrating an exemplary high frequency voltage supplied to the amplifier from the amplifier power source based on excitation intensity control by a potential control scheme.

The following describes the potential control scheme. FIG. 27 illustrates an exemplary RF voltage supplied from the amplifier power sources $120_1$ to $120_4$ to the amplifiers $110_1$ to $110_4$ in the potential control scheme. In the potential control scheme, an amplitude specified by the weak excitation signal S7 may be smaller than an amplitude specified by the strong excitation signal S6. As a result, as illustrated in FIG. 27, the amplitude of the RF voltage supplied from the amplifier power sources $120_1$ to $120_4$ to the amplifiers $110_1$ to $110_4$ may be small in the weak excitation duration Twk. In this manner, the amplitude of the RF voltage in the weak excitation duration Twk may be smaller than the amplitude of the RF voltage in the strong excitation duration Tst. Accordingly, excitation energy supplied to the amplifiers $110_1$ to $110_4$ per unit time in the weak excitation duration Twk is smaller than that in the strong excitation duration Tst.

10.3 Combination of PWM Scheme and Potential Control Scheme

Figure 28:
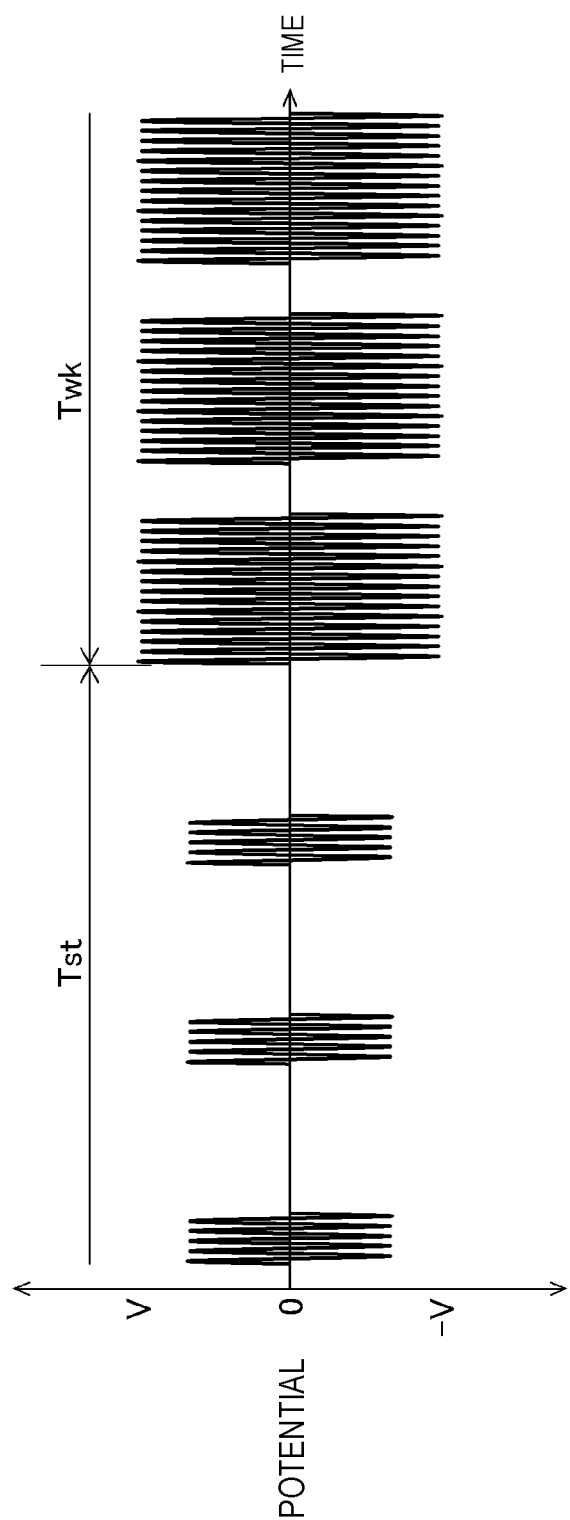
FIG. 28 is a diagram illustrating an exemplary high frequency voltage supplied to the amplifier from the amplifier power source based on excitation intensity control by a scheme as a combination of the PWM scheme and the potential control scheme.

The PWM scheme and the potential control scheme described above may be combined. FIG. 28 illustrates an exemplary RF voltage supplied from the amplifier power sources $120_1$ to $120_4$ to the amplifiers $110_1$ to $110_4$ when the PWM scheme and the potential control scheme are combined. When the PWM scheme and the potential control scheme are combined, the dynamic range of excitation intensity control increases. As a result, the RF voltage supplied from the amplifier power sources $120_1$ to $120_4$ to the amplifiers $110_1$ to $110_4$ can be adjusted more freely.

The above descriptions are intended to be illustrative only and not restrictive. Thus, it will be apparent to those skilled in the art that modifications may be made in the embodiments of the present disclosure without departing from the scope of the appended claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as having". Further, the modifier "a/an" described in the specification and the appended claims should be interpreted to mean "at least one" or "one or more".

What is claimed is:

1. A laser apparatus used together with an external device, the laser apparatus comprising:
   a master oscillator configured to output a first pulse laser beam;
   at least one amplifier disposed on an optical path of the first pulse laser beam output from the master oscillator;
   a sensor disposed on an optical path of a second pulse laser beam output from the at least one amplifier; and
   a laser controller configured to control operation of the laser apparatus based on a burst signal sent out from the external device and a signal obtained from the sensor,
   the laser controller
      causing the laser apparatus to perform burst oscillation based on the burst signal,
      controlling a beam parameter of at least one of the first pulse laser beam and the second pulse laser beam based on a signal obtained from the sensor in a burst duration in which the burst oscillation is performed, and
      detecting self-oscillation light from the amplifier based on a signal obtained from the sensor in a burst stop duration in which the burst oscillation is stopped, wherein
   the sensor is a beam profiler including a thermal infrared detection element,
   the beam parameter is an optical axis, and
   the laser controller determines that self-oscillation is occurring when a light amount detected by the beam profiler in the burst stop duration is equal to or larger than a light amount threshold set in advance and beam area of a light amount equal to or larger than the light amount threshold is equal to or larger than a beam area threshold set in advance.

2. The laser apparatus according to claim 1, wherein the light amount threshold for self-oscillation detection in the burst stop duration and the light amount threshold for beam detection in the burst duration are set to be different from each other.

3. The laser apparatus according to claim 1, wherein the light amount threshold for self-oscillation detection in the burst stop duration is set to be smaller than the light amount threshold for beam detection in the burst duration.

4. An extreme ultraviolet light generation system comprising:
   the laser apparatus according to claim 1;
   a chamber in which plasma is generated;
   a target supply unit configured to supply, into the chamber, a target from which the plasma is to be generated; and
   a control system configured to control the laser apparatus based on a burst signal received from an external device,
   extreme ultraviolet light being generated from plasma generated from the target supplied from the target supply unit into the chamber by irradiating the target with a laser beam output from the laser apparatus.

* * * * *